(12) United States Patent
Uchida et al.

(10) Patent No.: US 11,389,781 B2
(45) Date of Patent: Jul. 19, 2022

(54) METAL ORGANIC FRAMEWORK NANOSHEET AND METHOD FOR PRODUCING SAME

(71) Applicant: JAPAN SCIENCE AND TECHNOLOGY AGENCY, Saitama (JP)

(72) Inventors: Yoshiaki Uchida, Kyoto (JP); Norikazu Nishiyama, Osaka (JP); Takeru Omiya, Kanagawa (JP); Takuto Nakai, Osaka (JP)

(73) Assignee: JAPAN SCIENCE AND TECHNOLOGY AGENCY, Saitama (JP)

( * ) Notice: Subject to any disclaimer, the term of this patent is extended or adjusted under 35 U.S.C. 154(b) by 652 days.

(21) Appl. No.: 16/319,743

(22) PCT Filed: Jul. 21, 2017

(86) PCT No.: PCT/JP2017/026582
§ 371 (c)(1),
(2) Date: Jan. 22, 2019

(87) PCT Pub. No.: WO2018/016650
PCT Pub. Date: Jan. 25, 2018

(65) Prior Publication Data
US 2019/0247825 A1     Aug. 15, 2019

(30) Foreign Application Priority Data

Jul. 22, 2016 (JP) .............................. JP2016-144499
Mar. 3, 2017 (JP) .............................. JP2017-041002

(51) Int. Cl.
*B01D 53/22* (2006.01)
*B01J 20/22* (2006.01)
(Continued)

(52) U.S. Cl.
CPC ............ *B01J 20/226* (2013.01); *B01D 53/04* (2013.01); *B01D 53/228* (2013.01);
(Continued)

(58) Field of Classification Search
CPC ............ B01D 53/229; B01D 2257/504; B01D 53/228; B01D 2257/40; B01D 53/04;
(Continued)

(56) References Cited

U.S. PATENT DOCUMENTS 8,313,560 B1 * 11/2012 Cote .................. B01J 20/28097
                                                        95/90
10,274,421 B2 * 4/2019 Chang ................ G01N 21/7703
(Continued)

FOREIGN PATENT DOCUMENTS

JP     H04-182309 A     6/1992
JP     H04-210227 A     7/1992
(Continued)

OTHER PUBLICATIONS

Zhenhua Cong et al., "Controllable synthesis of ultrathin gold nanomembranes", RSC Advances, received Mar. 18, 2016, published Apr. 25, 2016, p. 45031-45035, Issue 51, 2016, DOI: 10.1039/c6ra07140f, The Royal Society of Chemistry.
(Continued)

*Primary Examiner* — Anthony R Shumate
(74) *Attorney, Agent, or Firm* — Michael Best & Friedrich LLP

(57) ABSTRACT

The present disclosure provides a method for producing a metal organic framework nanosheet, including forming a metal organic framework in a sheet form between two monolayers constituting a single bilayer membrane in a case where the bilayer membranes form a hyper-swollen lamellar phase in a solvent. The present disclosure relates to a metal organic framework nanosheet including a metal organic
(Continued)

framework disposed, in a sheet form, between two monolayers constituting a single bilayer membrane, wherein a plurality of the bilayer membranes forms a hyper-swollen lamellar phase in a solvent.

30 Claims, 12 Drawing Sheets

(51) Int. Cl.
| | |
|---|---|
| C07F 1/08 | (2006.01) |
| B01J 20/28 | (2006.01) |
| B01J 20/30 | (2006.01) |
| B32B 27/00 | (2006.01) |
| B01J 20/26 | (2006.01) |
| B01J 19/00 | (2006.01) |
| B32B 9/00 | (2006.01) |
| B01D 71/06 | (2006.01) |
| B01D 53/04 | (2006.01) |
| B01D 69/14 | (2006.01) |
| C01G 7/00 | (2006.01) |

(52) U.S. Cl.
CPC ......... *B01D 53/229* (2013.01); *B01D 69/147* (2013.01); *B01J 71/06* (2013.01); *B01J 19/00* (2013.01); *B01J 20/26* (2013.01); *B01J 20/28* (2013.01); *B01J 20/28007* (2013.01); *B01J 20/28035* (2013.01); *B01J 20/30* (2013.01); *B01J 20/3085* (2013.01); *B32B 9/00* (2013.01); *B32B 27/00* (2013.01); *C01G 7/00* (2013.01); *C07F 1/08* (2013.01); *B01D 2253/204* (2013.01); *B01D 2257/40* (2013.01); *B01D 2257/504* (2013.01)

(58) Field of Classification Search
CPC .............. B01D 71/06; B01D 2253/204; B01D 69/147; B01J 20/3085; B01J 20/28035; B01J 20/26; B01J 20/30; B01J 20/226; B01J 20/28007; B01J 20/28; B01J 19/00; B32B 9/00; B32B 27/00; C01G 7/00; C07F 1/08

See application file for complete search history.

(56) References Cited

U.S. PATENT DOCUMENTS

| | | | | |
|---|---|---|---|---|
| 2008/0299369 | A1 | 12/2008 | Adachi et al. | |
| 2010/0108604 | A1* | 5/2010 | Aerts ................. | B01D 61/362 |
| | | | | 210/640 |
| 2013/0023403 | A1* | 1/2013 | Larsen ................. | C07F 15/025 |
| | | | | 502/164 |
| 2014/0212944 | A1* | 7/2014 | Tian .................... | B01J 31/1691 |
| | | | | 435/180 |
| 2017/0081346 | A1* | 3/2017 | Yaghi .................. | B01J 20/2809 |
| 2018/0274013 | A1* | 9/2018 | Zhang ................. | C12Q 1/6825 |
| 2018/0297008 | A1* | 10/2018 | Stabler ................ | B01J 20/2803 |
| 2018/0318789 | A1* | 11/2018 | Stabler .............. | B01J 20/28064 |
| 2020/0079796 | A1* | 3/2020 | Seyedpour .......... | B01J 31/2208 |
| 2021/0016232 | A1* | 1/2021 | Liu ...................... | B01J 20/3265 |
| 2021/0039061 | A1* | 2/2021 | Jose .................... | B01J 19/1887 |
| 2021/0122775 | A1* | 4/2021 | Ling ................... | C07F 15/045 |

FOREIGN PATENT DOCUMENTS

| | | |
|---|---|---|
| JP | H10-076594 A | 3/1998 |
| JP | 2006-000929 A | 1/2006 |
| JP | 2006-049729 A | 2/2006 |
| JP | 4765079 B2 | 9/2011 |
| JP | 2014-225485 A | 12/2014 |
| JP | 2015-058416 A | 3/2015 |
| WO | WO-2004/076532 A1 | 9/2004 |

OTHER PUBLICATIONS

R.Strey, "I. Experimental Facts: Water-Nonionic Surfactant Systems, and the Effect of Additives", Berichte der Bunsengesellschaft Physikalische Chemie banner, 1996, p. 182-189, vol. 100, Issue 3, DOI: 10.1002/bbpc.19961000303, Wiley-VCH Verlag GmbH & Co.KGaA, Weinheim, Germany.

Per-Gunnar Nilsson et al., "Nuclear magnetic Resonance Self-Diffusion and Proton Relaxation Studies of Nonionic Surfactant Solutions. Aggregate Shape in Isotropic Solutions above the Clouding Temperature", The Journal of Physical Chemistry, Sep. 1984, p. 4764-4769, vol. 88(20), DOI: 10.1021/j150664a063, ACS Publications, American Chemical Society, USA.

C. Stubenrauch et al., "A new approach to lamellar phases ($L_\alpha$) in water-non-ionic surfactant systems", Journal Liquid Crystals, Jan. 2004, published online May 19, 2010, p. 39-53, vol. 31, 2004, No. 1, DOI: 10.1080/02678290310001628555, Taylor & Francis Group.

A.A. Ali et al., "Formation of liquid crystal and other non-fluid phases in emulsions containing non-ionic surfactants", The Journal of Pharmacy and Pharmacology, received Oct. 28, 1977, published Sep. 1978, p. 205-213, vol. 30, Issue 1, DOI: 10.1111/j.2042-7158.1978.tb13206.x, Royal Pharmaceutical Society, UK.

Yoshiaki Uchida et al., "Nanosheet Formation in Hyperswollen Lyotropic Lamellar Phases", Journal of the American Chemical Society, received Oct. 30, 2015, published Jan. 25, 2016, p. 1103-1105, vol. 138(4), DOI: 10.1021.jacs.5b11256, ACS Publications, American Chemical Society, USA.

International Search Report, issued in Application No. PCT/JP2017/026582, dated Oct. 17, 2017.

* cited by examiner

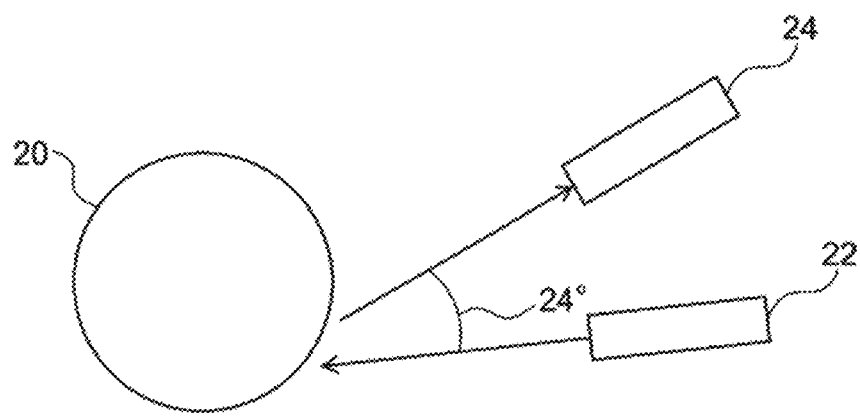
FIG.9
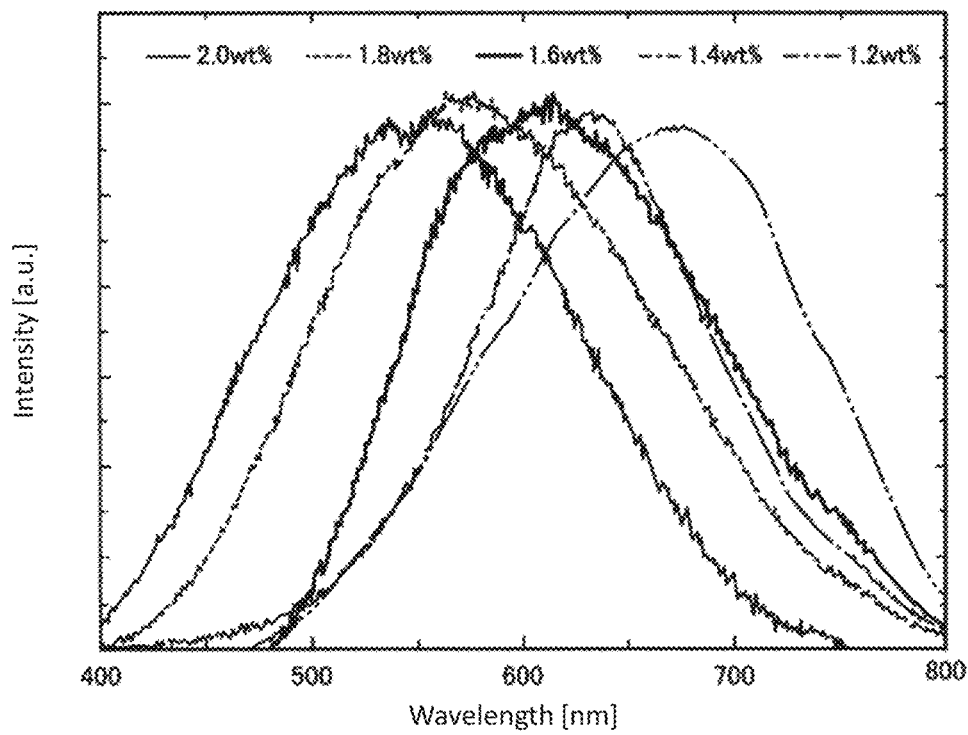
FIG.10
| $C_nE_m$ | $C_{10}E_5$ | $C_{12}E_6$ | $C_{12}E_5$ | $C_{10}E_4$ | $C_{12}E_3$ | $C_{12}E_2$ |
|---|---|---|---|---|---|---|
| n/m | 2 | 2 | 2.4 | 2.5 | 4 | 6 |
| Formation of hyper-swollen lamellar phase | × | × | ○ | ○ | ○ | × |
FIG.11

METAL ORGANIC FRAMEWORK NANOSHEET AND METHOD FOR PRODUCING SAME

TECHNICAL FIELD

The present disclosure relates to a metal organic framework nanosheet and a method for producing the same.

BACKGROUND ART

Some nano-size materials, such as nanosheets, exhibit interesting properties that are not expected to be seen in a bulk phase. Therefore, various methods for producing nanosheets have been studied. Known conventional methods for producing nanosheets are: bottom-up techniques such as a sol-gel method, an electrolytic oxidation method, a CVD method and a drop casting method; and top-down techniques that form a layered compound by using a material for forming a target nanosheet, intercalate a thick guest between those layers, and then separate a single layer therefrom. In some cases, however, the top-down techniques have a limitation on the substances of the nanosheet to be obtained and require a step of baking at a high temperature from 800° C. to 1300° C. for a long time. The bottom-up techniques are required to produce a thinner nanosheet, and thus new methods have been studied. Examples of such nanosheet production methods include Patent Literatures 1 and 2, and Non-Patent Literature 1. The Patent Literature 1 discloses a composite nanosheet on a liquid-liquid interface. The composite nanosheet is formed on an interface between an organic phase and an aqueous phase. The composite nanosheet is composed of a molecular membrane consisting of a surfactant and having a lamellar structure, and a metal oxide nanosheet formed along a plane direction of the molecular membrane. In this literature, the metal oxide nanosheet is formed on a bilayer membrane, that is, the metal oxide nanosheet is formed outside of the bilayer membrane.

The Patent Literature 2 discloses a single-layer, self-supporting organic metal nanomembrane. The nanomembrane has a plurality of complex molecules forming a membrane by crosslinking two-dimensionally with each other. Each of the complex molecules consists of one metal atom, and a bimolecular derivative of terpyridine or bipyridine. The derivative has two thiol groups. The thiol groups of the derivative are present on both opposing surfaces of the membrane. The metal atom is bonded to at least a part of the thiol groups. In this literature, a multilayer sheet is grown on a substrate by electron beam exposure. The Non-Patent Literature 1 discloses a gold nanosheet with excellent optical and electrical properties, produced using a lamellar phase. In the method of the Non-Patent Literature 1, the nanosheet is formed in a portion having an affinity for a solvent, and thus the method is applicable to materials, such as gold, that can be formed into a nanosheet easily. On the other hand, this method has a problem in that since the nanosheet is formed in a solvent, it is impossible to form the nanosheet by blocking its formation in a thickness direction just because there is no hindrance in the thickness direction, and thus it is not easy to form a material into a sheet in the case where the material is a compound, such as a metal organic framework, that easily develops a three-dimensional structure. The method of the Non-Patent Literature 1 also has a problem in that since the nanosheet is obtained using a hydrogel having a lamellar phase, the method for forming the sheet is limited to a drop casting method.

CITATION LIST

Patent Literature

Patent Literature 1: JP 4765079 B
Patent Literature 2: JP 2014-225485 A

Non-Patent Literature

Non-Patent Literature 1: RSC Advances, 2016, 6. 45031-45035

SUMMARY OF INVENTION

Technical Problem

The present disclosure is intended to provide a new metal organic framework nanosheet and a method for producing the same.

Solution to Problem

The present disclosure provides the following embodiments.
[1] A metal organic framework nanosheet including a metal organic framework disposed, in a sheet form, between two monolayers constituting a single bilayer membrane, wherein a plurality of the bilayer membranes forms a hyper-swollen lamellar phase in a solvent.
[2] The metal organic framework nanosheet according to the embodiment [1], wherein the bilayer membranes are composed of a nonionic amphiphile.
[3] The metal organic framework nanosheet according to the embodiment [2], wherein the nonionic amphiphile is at least one selected from the group consisting of an ester type surfactant, an ether type surfactant, an ester ether type surfactant, an alkanolamide type surfactant, alkyl glycoside and a higher alcohol.
[4] The metal organic framework nanosheet according to the embodiment [3], wherein the nonionic amphiphile is the ether type surfactant, and the ether type surfactant is at least one selected from the group consisting of polyethylene glycol monoalkyl ether and polyoxyethylene alkyl phenyl ether.
[5] The metal organic framework nanosheet according to the embodiment [1], wherein the bilayer membranes are composed of polyethylene glycol monoalkyl ether represented by Formula (1) below:

[Chemical Formula 1]

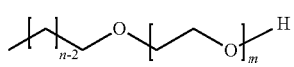

(1)

where n denotes the number of carbon atoms in an alkyl group in a hydrophobic portion, and m denotes the number of ethylene oxides in a hydrophilic portion.
[6] The metal organic framework nanosheet according to the embodiment [5], wherein $2<n/m<6$.
[7] The metal organic framework nanosheet according to the embodiment [5], wherein n is 12 and m is 5.

[8] The metal organic framework nanosheet according to any one of the embodiments [1] to [6], wherein the solvent includes water or a mixed solution of water and a water-soluble organic solvent.

[9] The metal organic framework nanosheet according to the embodiment [5], wherein n is 12 and m is 6, and furthermore, the solvent includes water and an organic solvent.

[10] The metal organic framework nanosheet according to any one of the embodiments [6] to [9], wherein the metal organic framework is a metal organic framework containing a highly lipophilic ligand as a component.

[11] The metal organic framework nanosheet according to any one of the embodiments [1] to [10], wherein the hyper-swollen lamellar phase has a lamellar structure in which a distance between any adjacent two of the bilayer membranes is 50 nm or more.

[12] A metal organic framework nanosheet dispersion including at least one metal organic framework nanosheet in a dispersed state in a liquid, wherein the metal organic framework nanosheet is the metal organic framework nanosheet according to any one of the embodiments [1] to [11].

[13] A method for producing a nanosheet, including forming a nanosheet between two monolayers constituting a single bilayer membrane in a case where a plurality of the bilayer membranes forms a hyper-swollen lamellar phase in a solvent.

[14] The method for producing the nanosheet according to the embodiment [13], wherein the nanosheet is composed of a metal organic framework.

[15] The method for producing the nanosheet according to the embodiment [14], wherein the bilayer membranes are formed in the solvent, an organic ligand is added in the solvent to form the hyper-swollen lamellar phase formed of the bilayer membranes, and a metal ion is then added in the solvent to form the metal organic framework nanosheet between the two monolayers constituting the single bilayer membrane.

[16] The method for producing the nanosheet according to the embodiment [14] or the embodiment [15], wherein the bilayer membranes are removed after the metal organic framework nanosheet is formed between the two monolayers constituting the single bilayer membrane.

[17] The method for producing the nanosheet according to any one of the embodiments [14] to [16], wherein the bilayer membranes are composed of polyethylene glycol monoalkyl ether represented by Formula (1) below:

[Chemical Formula 2]

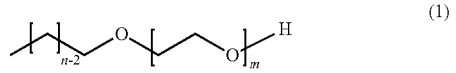

(1)

where n denotes the number of carbon atoms in an alkyl group in a hydrophobic portion, and m denotes the number of ethylene oxides in a hydrophilic portion.

[18] The method for producing the nanosheet according to the embodiment [17], wherein $2<n/m<6$.

[19] The method for producing the nanosheet according to the embodiment [17], wherein n is 12 and m is 5.

[20] The method for producing the nanosheet according to any one of the embodiments [15] to [19], wherein the solvent includes water or a mixed solution of water and a water-soluble organic solvent.

[21] The method for producing the nanosheet according to the embodiment [17], wherein n is 12 and m is 6, and furthermore, the solvent includes water and an organic solvent.

[22] The method for producing the nanosheet according to any one of the embodiments [14] to [21], wherein the metal organic framework is a metal organic framework containing a highly lipophilic ligand as a component.

[23] The method for producing the nanosheet according to the embodiment [13], wherein the nanosheet is composed of a metal oxide or a metal.

[24] The method for producing the nanosheet according to the embodiment [23], wherein the bilayer membranes are formed in the solvent, an amphiphile is added in the solvent to form the hyper-swollen lamellar phase formed of the bilayer membranes, and a metal-containing compound having an oxygen atom or a metal-containing compound having no oxygen atom is then added in the solvent to form the metal oxide nanosheet or the metal nanosheet between the two monolayers constituting the single bilayer membrane.

[25] The method for producing the nanosheet according to the embodiment [24], wherein the solvent includes a mixed solution of water and an organic solvent.

[26] The method for producing the nanosheet according to the embodiment [24] or the embodiment [25], wherein a surface-active auxiliary is further added in the solvent.

[27] The method for producing the nanosheet according to any one of the embodiments [24] to [26], wherein the amphiphile is an anionic amphiphile.

[28] A gas separation membrane including the metal organic framework nanosheet according to any one of the embodiments [1] to [11].

[29] The gas separation membrane according to the embodiment [28], the gas separation membrane being for nitrogen separation or carbon dioxide separation.

[30] A metal oxide nanosheet including a metal oxide disposed, in a sheet form, between two monolayers constituting a single bilayer membrane, wherein a plurality of the bilayer membranes forms a hyper-swollen lamellar phase in a solvent.

[31] A gold nanosheet including a gold compound disposed, in a sheet form, between two monolayers constituting a single bilayer membrane, wherein a plurality of the bilayer membranes forms a hyper-swollen lamellar phase in a solvent.

Advantageous Effects of Invention

The present disclosure provides a new metal organic framework nanosheet and a method for producing the same. Unlike the Patent Literatures 1 and 2 and the Non-Patent Literature 1, the method for producing the nanosheet according to the present disclosure has no limitation on start material, making it possible to produce various nanosheets. Moreover, the method for producing the nanosheet according to the present disclosure requires no step of high temperature heating, which is industrially advantageous. Also, in the case of the new metal organic framework nanosheet according to the present disclosure, the pressure at which molecules (hereinafter referred to as admolecules) to be adsorbed start to be adsorbed thereto or start to be desorbed therefrom can be shifted to a higher value than in the case of bulk metal organic frameworks.

BRIEF DESCRIPTION OF DRAWINGS

FIG. 9 is a diagram showing a method for checking the occurrence of the formation of the hyper-swollen lamellar phase.

FIG. 10 is a graph showing a relationship between the concentration of polyethylene glycol monoalkyl ether, which is a nonionic amphiphile, and reflection spectrum.

FIG. 11 is a table showing a relationship between the composition of polyethylene glycol monoalkyl ether, which is a nonionic amphiphile, and the occurrence of the formation of the hyper-swollen lamellar phase. The polyethylene glycol monoalkyl ether is $C_nE_m$ where $C_n$ is a hydrophobic portion and $E_m$ is a hydrophilic portion, and n denotes the number of carbon atoms in an alkyl group in the hydrophobic portion, and m denotes the number of ethylene oxides in the hydrophilic portion.

DESCRIPTION OF EMBODIMENTS

Figure 1A:
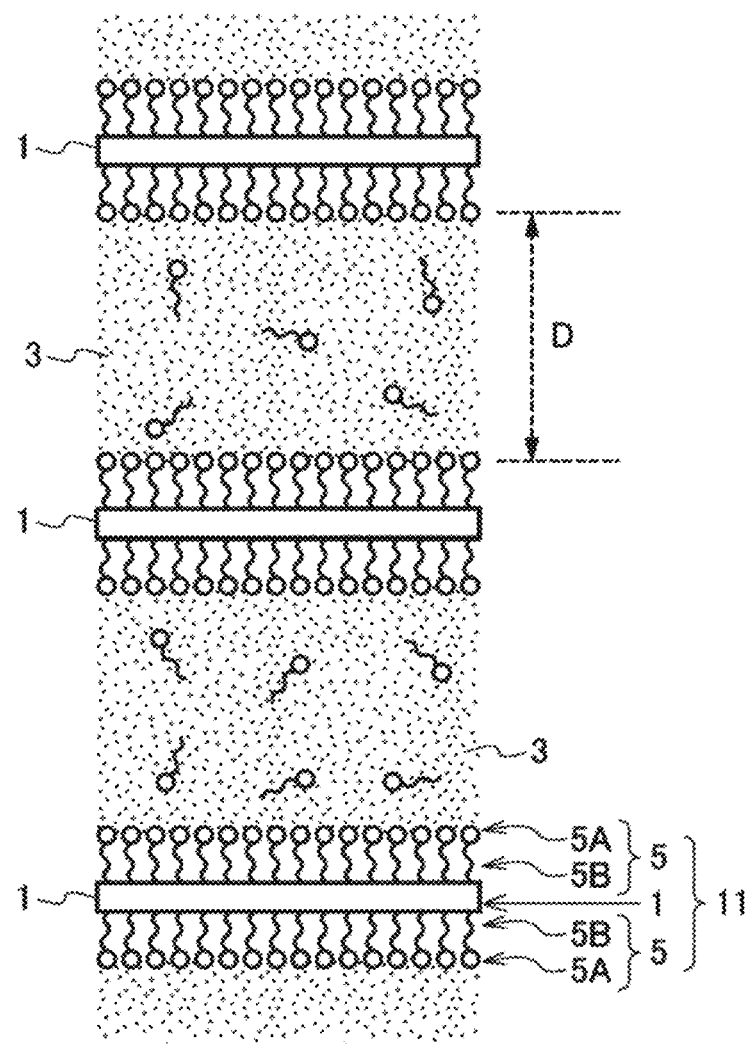
FIG. 1A is a schematic view showing a method for producing a metal organic framework nanosheet according to Embodiment 1.

Porous frameworks are produced by combining various raw materials and growth methods, and expected to be applied to gas separation membranes, for example. Particularly, metal organic frameworks are applied to carbon dioxide separation membranes because of their high affinity for carbon dioxide.

When the metal organic frameworks are applied to separation membranes, molecules to be separated are adsorbed to the metal organic frameworks by pressurization, and the molecules to be separated are desorbed from the metal organic frameworks by depressurization. Conventional metal organic frameworks have a problem in that it is difficult for carbon dioxide to be desorbed therefrom even under a low pressure and a lot of energy is required in the desorption process. It is ideal that the molecules to be separated are desorbed at 0.1 MPa or more.

Recently, it was reported that metal organic framework nano particles exhibit a gate-opening pressure higher than that of bulk metal organic frameworks. It is thought to be possible to further raise the gate-opening pressure by reducing the size of the particles. In the present description, the gate-opening pressure means both a pressure at which admolecules start to be adsorbed and a pressure at which admolecules start to be desorbed.

Intensive studies have been made to find a new metal organic framework nanosheet and a method for producing the same. As a result, the following knowledge has been obtained. It should be noted that the knowledge below was just a motivation to complete the present disclosure and does not limit the present disclosure.

An insight gained was that a space between two monolayers constituting a single bilayer membrane can possibly be used as a reaction field. Thus, organic ligands and metal ions were added sequentially in a solvent, such as water, composed of polar molecules when bilayer membranes formed a hyper-swollen lamellar phase in the solvent. Surprisingly, it was found that an extremely thin metal organic framework nanosheet with a thickness of several nanometers can be obtained.

When the organic ligands, which are nonpolar molecules, are added to the solvent, they gather between the two monolayers. It was thought that by adding the metal ions thereto, a reaction (continuous formation of coordinate bonds) to form a metal organic framework proceeds between the two monolayers, forming a metal organic framework nanosheet between the two monolayers. Since the thickness of the bilayer membrane is limited, a nanosheet with a limited thickness can be formed easily.

Hereinafter, embodiments of the present disclosure will be described referring to the attached drawings. The embodiments below are just examples and do not limit the present disclosure. It should be noted that the word "lipophilic" has the same meaning as the word "hydrophobic." In the present description, the upper limits and the lower limits of numerical value ranges (such as the content of each component, the value calculated from each component, and each physical property) can be combined suitably.

Each embodiment described below shows one preferable example of the present disclosure. The numerical values, shapes, materials, components, the arrangement locations and connection manners of the components, steps, and the order of the steps described in the following embodiments are just examples and do not limit the present disclosure.

Among the components in the following embodiments, the components which are not described in the independent claims of the present disclosure are explained as arbitrary components constituting more preferable embodiments. The explanations for the components indicated by the same reference numerals and signs in the drawings are omitted in some cases. The drawings aim to show each component schematically for better understanding and are not exact in shape, scale ratio, etc. in some cases. In the production method, the order of steps, etc. may be changed, and also another step may be added as needed.

Embodiment 1

A metal organic framework nanosheet according to Embodiment 1 of the present disclosure includes a metal organic framework disposed, in a sheet form, between two monolayers constituting a single bilayer membrane. A plurality of the bilayer membranes forms a hyper-swollen lamellar phase in a solvent.

The metal organic framework (MOF) is a porous material having a high specific surface area and includes a metal and an organic compound. Specifically, the metal organic framework is a porous structure formed by utilizing coordinate bonding between various metal ions and organic compounds. More specifically, the metal organic framework can be, for example, a highly periodic crystalline compound obtained by forming a complex between a suitable rigid organic ligand and a metal cluster whose direction of coordination is specified. The metal organic framework is sometimes referred to as a porous coordination polymer (PCP). The metal organic framework is applicable to various usages such as gas adsorption and separation.

A metal organic framework nanosheet 1 is a sheet-form structure composed of the metal organic framework. The thickness of the metal organic framework nanosheet 1 is not particularly limited as long as it is in nano size and can be determined suitably according to required usage. The thickness of the metal organic framework nanosheet 1 is usually 0.1 nm or more, preferably 0.5 nm or more, and more preferably 1 nm or more. The thickness of the metal organic framework nanosheet 1 is usually 100 nm or less, preferably 50 nm or less, and more preferably 20 nm or less. This is because a thickness equal to or more than the lower limit enhances usability, and a thickness equal to or less than the upper limit provides practically sufficient thinness. Also, a thickness equal to or more than the lower limit and equal to or less than the upper limit is preferable to enhance the gate-opening pressure.

The size of the metal organic framework nanosheet 1 in a plane direction is not particularly limited and can be determined suitably according to the start material to be used and the usage of the metal organic framework nanosheet 1. Practically, one side is usually 50 nm or more and preferably 100 nm or more, and also it is usually 1 μm or less and preferably 500 nm or less.

The aspect ratio (horizontal width/thickness) of the metal organic framework nanosheet 1 is not particularly limited and can be determined suitably according to the start material to be used and the usage of the metal organic framework nanosheet 1. The aspect ratio is usually 10 or more, preferably 20 or more, more preferably 50 or more, and still more preferably 100 or more. Also, the aspect ratio is usually 5000 or less, and preferably 1000 or less.

With regard to the metal organic framework nanosheet, the bilayer membranes are preferably composed of an amphiphile. In a preferable embodiment, the amphiphile may be a nonionic amphiphile from the viewpoint that the nonionic amphiphile makes it easy to adjust the balance between a hydrophilic portion and a hydrophobic portion in order to form the hyper-swollen lamellar phase.

As the nonionic amphiphile, there can be mentioned an ester type surfactant, an ether type surfactant, an ester ether type surfactant, an alkanolamide type surfactant, alkyl glycoside and a higher alcohol. As the nonionic amphiphile, a commercially available one can be used.

Examples of the ester type surfactant include: sucrose fatty acid ester such as sucrose laurate ester, sucrose oleate ester and sucrose monopalmitate ester; sorbitan fatty acid ester such as sorbitan caprylic acid monoester, sorbitan caprylic acid diester, sorbitan caproic acid monoester, sorbitan caproic acid diester, sorbitan capric acid monoester, sorbitan capric acid diester, sorbitan lauric acid monoester, sorbitan lauric acid diester, sorbitan myristic acid monoester and sorbitan myristic acid diester; monoglycerine fatty acid ester such as glyceryl caprylate, glyceryl caprate, glyceryl laurate, glyceryl myristate and glyceryl di(laurate/myristate); polyglyceryl fatty acid ester such as diglyceryl monostearate, diglyceryl monooleate, diglyceryl dioleate, diglyceryl monoisostearate, tetraglyceryl monostearate, tetraglyceryl tristearate, tetraglyceryl pentastearate, tetraglyceryl pentaoleate, hexaglyceryl monolaurate, hexaglyceryl monomyristate, hexaglyceryl monostearate, hexaglyceryl monooleate, hexaglyceryl tristearate, hexaglyceryl pentastearate, hexaglyceryl pentastearate, hexaglyceryl polyricinoleate, decaglyceryl monolaurate, decaglyceryl monomyristate, decaglyceryl monostearate, decaglyceryl monooleate, decaglyceryl monolinoleate, decaglyceryl monoisostearate, decaglyceryl distearate, decaglyceryl dioleate, decaglyceryl diisostearate, decaglyceryl tristearate, decaglyceryl trioleate, decaglyceryl triisostearate, decaglyceryl pentastearate, decaglyceryl pentaoleate, decaglyceryl pentaisostearate, decaglyceryl heptastearate, decaglyceryl heptaoleate, decaglyceryl heptaisostearate, decaglyceryl decastearate, decaglyceryl decaoleate and decaglyceryl decaisostearate.

Examples of the ether type surfactant include: polyethylene glycol monoalkyl ether including polyethylene glycol monoalkyl ether ($C_nE_m$) represented by Formula (1) below,

[Chemical Formula 3]

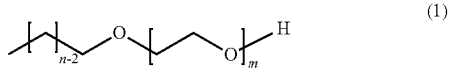

(1)

where n denotes the number of carbon atoms in an alkyl group in a hydrophobic portion, and m denotes the number of ethylene oxides in a hydrophilic portion; and polyoxyethylene alkyl phenyl ether such as poly(oxyethylene) octyl phenyl ether represented by Formula (2) below,

[Chemical Formula 4]

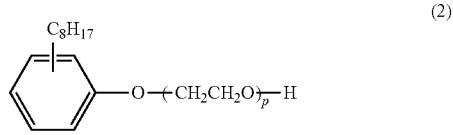

(2)

where p, which denotes the number of moles of ethyleneoxide added, may be 3 to 40 or 5 to 20), and poly(oxyethylene) nonyl phenyl ether represented by Formula (3) below,

[Chemical Formula 5]

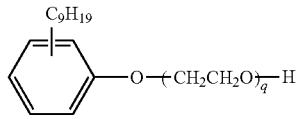

(3)

where q, which denotes the number of moles of ethyleneoxide added, may be 3 to 40 or 5 to 20.

Examples of the ester ether type surfactant include: polyoxyethylene fatty acid ester such as polyethylene glycol monostearate, polyethylene glycol monooleate and polyethylene glycol dioleate; polyoxyethylene hexytane fatty acid ester; polyoxyethylene sorbitan fatty acid ester (the sorbitan fatty acid ester portion is the same as that of the ester type surfactant); and sorbitan fatty acid ester polyethylene glycol (the sorbitan fatty acid ester portion is the same as that of the ester type surfactant).

Examples of the alkanolamide type surfactant include lauric acid monoethanolamide, lauric acid monoisopropanolamide, lauric acid diethanolamide, oleic acid diethanolamide, stearic acid diethanolamide, and fatty acid alkanolamide of cocamide DEA.

Examples of the alkyl glycoside include n-octyl-β-D-glucoside, n-octyl-β-D-maltoside, n-decyl-β-D-glucoside (decyl glucoside), n-decyl-β-D-maltoside, n-undecyl-β-D-glucoside, n-dodecyl-β-D-glucoside (lauryl glucoside), n-tridecyl-β-D-glucoside, n-octadecyl-β-D-glucoside, n-heptyl-β-D-thioglucoside, n-octyl-β-D-thioglucoside and n-nonyl-β-D-thiomaltoside.

As the higher alcohol, there can be mentioned a higher alcohol having 12 to 18 carbon atoms, such as cetanol, stearyl alcohol, lauryl alcohol and oleyl alcohol.

In a preferable embodiment, the nonionic amphiphile may be composed of polyethylene glycol monoalkyl ether ($C_nE_m$) represented by Formula (1) below,

[Chemical Formula 6]

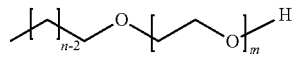

(1)

where n and m have the same meanings as those above, respectively.

In an embodiment, 2<n/m<6, 2.2<n/m<5, or 2.4≤n/m≤4 may hold in the Formula (1). The lower limit of n/m is not particularly limited, and it may be 2, 2.2 or 2.4. The upper limit of n/m is not particularly limited, and it may be 6, 5 or 4. The value n/m within these ranges makes it possible to easily form the hyper-swollen lamellar phase just by carrying out a process such as mixing a solvent that is water or a mixed solution of water and a water-soluble organic solvent to be described below together with polyethylene glycol monoalkyl ether and stirring the resulting mixture, flowing the mixture through a flow passage, and applying a shearing stress to the mixture. Examples of the flow passage include the bubble fixation flow passage device described in JP 2015-058416 A. The stirring rate may be, for example, 1000 rpm or less, 750 rpm or less, and 500 rpm or less. It should be noted that n/m≤2 may hold in the Formula (1). Even in the case where n/m≤2, it is possible to form the hyper-swollen lamellar phase by using, for example, an organic solvent, such as 1-hexanol, styrene and toluene, together with water. Also, n may be one or more and m may be one or more. Furthermore, n may be 250 or less and may be 100 or less, and m may be 40 or less and may be 20 or less.

In another embodiment, n may be 12 and m may be 5 in the Formula (1) representing polyethylene glycol monoalkyl ether. In this embodiment, the solvent may be water or a mixed solution of water and a water-soluble organic solvent. Examples of the water-soluble organic solvent according to the present disclosure include: polyhydric alcohols such as glycerin, ethylene glycol, diethylene glycol, isopropylidene glycerol, 1,3-butanediol, 3-methyl-1,3-butanediol, triethylene glycol, propylene glycol, dipropylene glycol, trimethylolpropane, trimethylolethane, ethylene glycol, diethylene glycol, dipropylene glycol, tripropylene glycol, tetraethylene glycol, hexylene glycol, polyethylene glycol, polypropylene glycol, 1,5-pentanediol, 1,6-hexanediol, glycerol, 1,2,6-hexanetriol, 1,2,4-butanetriol, 1,2,3-butanetriol and petriol; polyhydric alcohol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether and propylene glycol monoethyl ether; polyhydric alcohol aryl ethers such as ethylene glycol monophenyl ether and ethylene glycol monobenzyl ether; a nitrogen-containing heterocyclic compound such as 2-pyrrolidone, N-methyl-2-pyrrolidone, N-hydroxyethyl-2-pyrrolidone, 1,3-dimethyl imidazolidone, ε-caprolactam and γ-butyrolactam; amides such as formamide, N-methylformamide, N,N-dimethylformamide, N,N-dimethyl-β-methoxypropionamide and N,N-dimethyl-β-butoxypropionamide; amines such as monoethanolamine, diethanolamine, triethanolamine, monoethylamine, diethylamine and triethylamine; a sulphur containing compound such as dimethylsulfoxide, sulfolane and thiodiethanol; 3-ethyl-3-hydroxymethyloxetane, propylene carbonate and ethylene carbonate; polyol having 8 to 11 carbon atoms; glycol ether having 8 to 11 carbon atoms, and a lower alcohol and the like. Glycerin is preferable. One of them alone, or two of them or more may be mixed together with water and used as the mixed solution.

In another embodiment, n may be 12 and m may be 6, and furthermore, the solvent may include water and an organic solvent. Examples of the organic solvent to be used together with water include: toluene, o-xylene, m-xylene, p-xylene, benzene, carbon tetrachloride, methylene chloride, 1,2-dichloroethane, 1,1,2-trichloroethane, trichloroethylene, chloroform, monochlorobenzene, dichloroethylidene, methyl acetate, ethyl acetate, methyl ethyl ketone and methyl isobutyl ketone; a polymerizable liquid such as styrene; and a hydrophobic ionic liquid. Examples of the hydrophobic ionic liquid include N,N-diethyl-N-methyl-N-(2-methoxyethyl)ammonium bis(trifluoromethane sulfonyl)imide (DEME-TFSI), 1-ethyl-3-methyl imidazolium tetrafluoro borate (EMI-BF$_4$), 1-ethyl-3-methyl imidazolium hexafluoro phosphate (EMI-PF$_6$), 1-ethyl-3-methyl imidazolium bis(trifluoromethane sulfonyl)imide (EMI-TFSI), 1-butyl-3-methyl imidazolium tetrafluoro borate (BMI-BF$_4$), 1-butyl-3-methyl imidazolium hexafluoro phosphate (BMI-PF$_6$) and 1-butyl-3-methyl imidazolium bis(trifluoromethane sulfonyl)imide (BMI-TFSI). As the organic solvent to be used together with water, toluene is preferable. The organic solvent, such as toluene, may be present inside the bilayer membrane.

The hyper-swollen lamellar phase is a specific lamellar phase swollen with a solvent 3 (such as water). More specifically, the hyper-swollen lamellar phase is a phase formed of a plurality of the bilayer membranes that are stacked in a layered form while sandwiching a layer of the solvent 3 therebetween. The hyper-swollen lamellar phase may be swollen with approximately 99 mass % of water. A distance D between two of the bilayer membranes shown in FIG. 1A may be 100 nm or more. The distance (the thickness of the layer of the solvent) between the two bilayer membranes may be several hundreds of nanometers. Each of the bilayer membranes may have a thickness of several nanometers. In the case of water-$C_{12}E_5$, an aqueous layer has a thickness of approximately 250 nm and an oil layer has a thickness of approximately 2 nm. The hyper-swollen lamellar phase may exhibit a color due to Bragg reflection in a visible light range. The distance between the two bilayer membranes can be dependent on the content of molecules (amphipathic molecules) constituting the bilayer membranes. The hyper-swollen lamellar phase may be a hyper-swollen lyotropic lamellar phase.

In the hyper-swollen lamellar phase, the mass ratio of the solvent 3 to the whole system is not particularly limited as long as the purpose of the present disclosure is accomplished. The mass ratio of the solvent 3 is usually 90 mass % or more, and may be preferably 95 mass % or more, more preferably 98 mass % or more, and further preferably 99 mass % or more. The upper limit is not particularly limited as long as it falls within a range that makes it possible to form the hyper-swollen lamellar phase for the solution the solute and the solvent. The theoretical upper limit is the highest possible concentration that allows the hyper-swollen lamellar phase to be formed for the solution of the solute and the solvent to be used. The "whole" means the total of all substances contained, including the solute and the solvent. In the hyper-swollen lamellar phase, the upper limit of the mass ratio of the solvent 3 to the whole can be 99 mass %, for example.

Figure 1B:
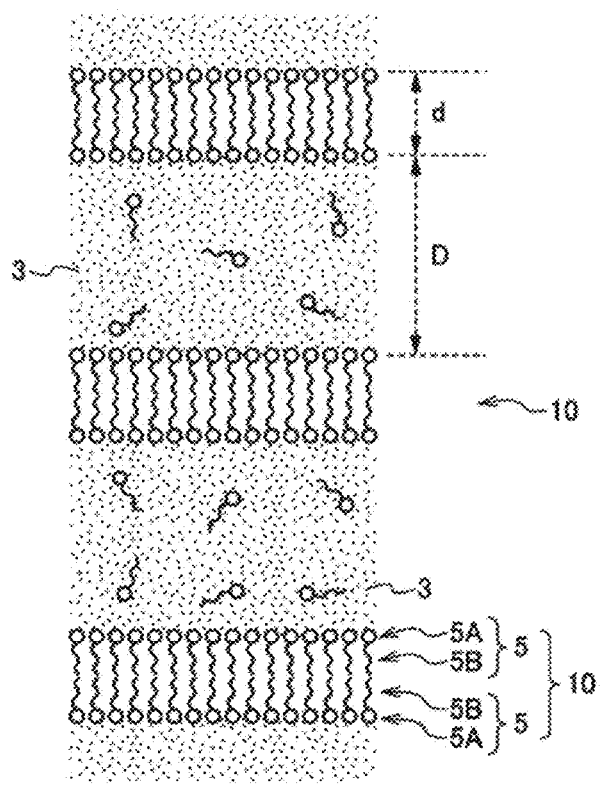
FIG. 1B is a schematic view showing bilayer membranes forming a hyper-swollen lamellar phase.
Figure 1C:
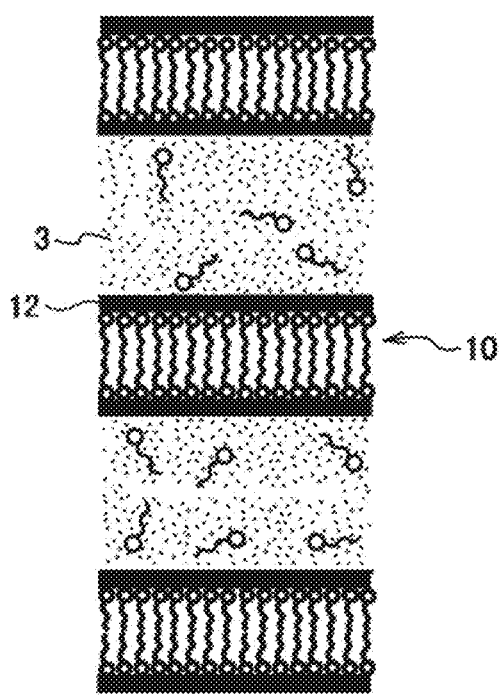
FIG. 1C is a schematic view showing a conventional method for producing a gold nanosheet.
Figure 2A:
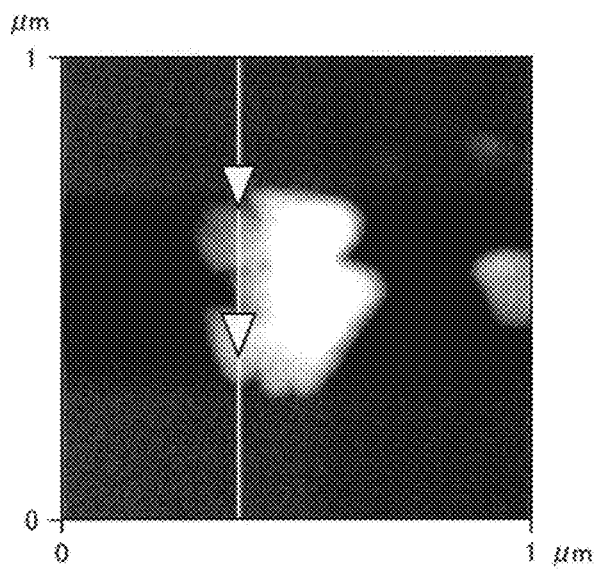
FIG. 2A shows a result of an observation on a metal organic framework nanosheet according to Example 1 with an atomic force microscope.
Figure 2B:
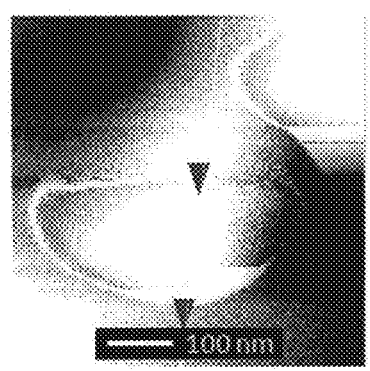
FIG. 2B shows a result of an observation on the metal organic framework nanosheet according to Example 1 with an atomic force microscope.

In the hyper-swollen lamellar phase, the distance D (also referred to as an "interlayer distance" in the present description) between any adjacent two bilayer membranes 10 is not particularly limited and can be determined suitably according to the materials to be used and the target usage. Usually, the distance D is 50 nm or more and 1000 nm or less (both end values included, which will be applied hereinafter). In order to reduce the thickness of the target nanosheet, it is preferable that the distance D be short. Preferably, the distance D is 500 nm or less, for example. In Embodiment 1, the distance D between adjacent two bilayer membranes means a distance between: an end of a portion 5A, which has an affinity for the solvent 3, of one of the bilayer membranes; and an end of the portion 5A, which has an affinity for the solvent 3, of the other bilayer membrane adjacent to the bilayer membrane, as shown in FIG. 1A and FIG. 1B.

A thickness d of the bilayer membrane 10 is not particularly limited. It is usually 1 nm or more and 20 nm or less.

The hyper-swollen lamellar phase is maintained stably also in a solution of a nonionic amphiphile due to the undulation of each layer and Helfrich interaction.

That is, by synthesizing the metal organic framework inside the double-layer membrane in the hyper-swollen lamellar phase, it is possible to produce a metal organic framework nanosheet that exhibits a gate-opening pressure higher than that of a bulk metal organic framework in carbon dioxide desorption that is important for absorption separation. It is also possible to produce a nanosheet from a metal organic framework that cannot be formed into nano-size particles or sheet by conventional methods.

The reason why the metal organic framework nano particles exhibit a high gate-opening pressure as described above is thought to be because the metal organic framework is reduced in size and that makes it difficult for its skeleton to be deformed. The thickness-direction size of the metal organic framework nanosheet of the present disclosure is smaller than the sizes of conventional metal organic framework nano particles. Such a small size is thought to contribute to raising the gate-opening pressure.

In the metal organic framework nanosheet, the metal organic framework contains an organic ligand as a component. As the organic ligand, a hydrophobic raw material (ligand) (hereinafter referred to as a "hydrophobic ligand" or a "highly lipophilic ligand") can be mentioned. The metal organic framework also contains a hydrophilic metal ion.

As the metal ion, ions of metals such as Cu, Zn, Ni, Mg, Co and Al can be mentioned, but it is not limited to these. Examples of the organic ligand include a hydrophobic ligand such as 4,4'-bipyridine, pyrazine and 5,5'-dimethyl-2,2'-bipyridyl, and also terephthalic acid, trimesic acid and 2,3-pyrazine dicarboxylic acid, but it is not limited to these. More specifically, the metal organic framework may be ELM-11 ($[Cu(bpy)_2(BF_4)_2]$(bpy=4,4'-bipyridine)) or ELM-13 ($[Cu(bpy)_2(CF_3BF_3)_2]$(bpy=4,4'-bipyridine)).

As another embodiment, there can be mentioned a composite nanosheet 11 including the metal organic framework nanosheet 1 and the bilayer membrane composed of an amphiphile 5, as shown in FIG. 1A. In the composite nanosheet 11, the metal organic framework nanosheet 1 is formed inside the bilayer membrane (between portions 5B having no affinity for the solvent 3 in FIG. 1A). The amphiphile and the bilayer membrane are as described above. The metal organic framework nanosheet 1 is a sheet-form structure composed of the metal organic framework as described above. The thickness of the composite nanosheet 11 is not particularly limited. Usually, it is 1 nm or more and 50 nm or less.

Embodiment 2

A metal organic framework nanosheet dispersion according to Embodiment 2 includes at least one metal organic framework nanosheet in a dispersed state in a liquid. The metal organic framework nanosheet is any one of the metal organic framework nanosheets according to Embodiment 1.

The nanosheet included in the dispersion is useful as a catalyst, an adsorbent, a material for synthesizing a thin film, etc.

Embodiment 3

A method for producing a nanosheet according to Embodiment 3 includes the step of forming a nanosheet between two monolayers constituting a single bilayer membrane in a case where a plurality of the bilayer membranes forms a hyper-swollen lamellar phase in a solvent.

An embodiment of the method for forming a nanosheet will be explained below by describing a method for forming the above-mentioned metal organic framework nanosheet as an example.

Among technologies for producing a metal organic framework nanosheet, etc., conventional methods, such as the one disclosed in the Patent Literature 2, utilizing self-assembling characteristic allow a nanosheet to be obtained only on a surface of a substrate. Therefore, it has been difficult for the conventional methods to realize a thin nanosheet. The present disclosure can realize a single-layer or multiple-layer nanosheet (a nanosheet having a thickness equal to the length of one to several repeating units in the metal organic framework). Moreover, in the conventional methods, such as the one disclosed in the Patent Literature 2, utilizing self-assembling characteristic, the nanosheet needs to be removed from the substrate when applied to a carbon dioxide separation membrane, etc. In the present disclosure, the metal organic framework nanosheet can be obtained also in a dispersed state because the dispersion is used at the time of synthesizing the metal organic framework nanosheet. In the method of the Non-Patent Literature 1, a nanosheet is obtained using a hydrogel, and thus the method for forming the sheet is limited to drop casting. In contrast, the present disclosure makes it possible to obtain a nanosheet in a liquid, and therefore the metal organic framework nanosheet can be produced also by spin coating, dip coating and the like besides drop casting. Furthermore, the method of the Non-Patent Literature 1 values chemical properties and forms a gold nanosheet 12 while allowing, in the solvent 3, the adsorption onto a surface of the bilayer membrane 10 that is composed of a nonionic surfactant and serves as a substrate. In contrast, unlike the Non-Patent Literature 1, the present disclosure forms a sheet inside the bilayer membrane (between the portions 5B having no affinity for the solvent 3 in FIG. 1A), valuing the physical viewpoint of providing steric hindrance in a thickness direction of the sheet. Therefore, it is difficult to apply the method of the Non-Patent Literature 1 to substances other than gold, which is easily formed into a nanosheet, and thus applications to metals other than gold and compounds are not suggested therein. In contrast, the present disclosure makes it possible to form a nanosheet easily due to the steric hindrance of the thickness direction even with a compound which tends to form a steric structure such as the metal organic framework.

It is thought that in an embodiment in which the metal organic framework is formed into a nanosheet and thus the metal organic framework (such as ELM-11 and ELM-13) is composed of several layers of nanosheet, the hydrogen bond between the layers of the metal organic framework is strengthened, which, as a result, prevents the admolecules from entering between the layers of the metal organic framework when being adsorbed. That is, the gate-opening pressure shifts to a higher value. This metal organic framework may be referred to as a "flexible MOF" because the gate opens and closes.

The metal organic framework nanosheet includes not only an organic ligand but also a hydrophilic metal ion. Examples of the organic ligand include a hydrophobic raw material (ligand). Thus, it is not obvious whether the raw material accumulates in the hydrophobic portion of the bilayer membrane and react. There is a possibility that the raw material accumulates in the hydrophilic portion when reacting. Therefore, in order to synthesize the metal organic framework nanosheet in the hydrophobic portion of the bilayer membrane, combination of the concentration of the organic ligand and the concentration of the metal ion, and optimization of the concentration of the amphiphile are required while the amount-of-substance ratio between the organic ligand and the metal ion is also taking into consideration.

The metal organic framework is neither thermally polymerized nor necessarily baked after being formed into a sheet. This makes it difficult for conventional methods for producing a carbon nanosheet to produce the metal organic framework, and thus these conventional methods have not been able to be used.

In the case of forming a sheet of the metal organic framework, the amount-of-substance ratio between the organic ligand and the metal ion is also important. When a y-coordination metal ion is added to an x-dentate organic ligand, it becomes easy to form a plane by having x/y or more of the metal ions relative to the amount of the organic ligands. For example, when a tetrahedral-coordination metal ion is added to a bidentate organic ligand, it becomes easy to form a plane by having the metal ions with the half amount of the organic ligands or more.

In order to adopt, as a preferable embodiment, the above-mentioned ratio to an aqueous solution of amphipathic molecules used in the method for producing the metal organic framework nanosheet, a lipophilic ligand is necessary.

In the method for producing the metal organic framework nanosheet, the metal organic framework nanosheet is formed between the two monolayers constituting the single bilayer membrane in a case where the bilayer membranes form the hyper-swollen lamellar phase in the solvent.

In a preferable embodiment of the method for producing the metal organic framework nanosheet, the bilayer membranes are formed in the solvent, an organic ligand is added in the solvent to form the hyper-swollen lamellar phase formed of the bilayer membranes, and a metal ion is then added in the solvent to form the metal organic framework nanosheet between the two monolayers constituting the single bilayer membrane. The solvent, the bilayer membranes, the amphiphile, the organic ligand, the hyper-swollen lamellar phase and the metal ion in this production method are as in the explanation of the metal organic framework nanosheet above. By using the organic ligand and the metal ion, coordinate bonding occurs continuously by a reaction and thus the metal organic framework is obtained. Since this reaction takes place between the two monolayers constituting the single bilayer membrane and also the metal organic framework nanosheet is produced in the solution in which the hyper-swollen lamellar phase is formed, the metal organic framework nanosheet is formed without being aggregated.

Hereinafter, the metal organic framework nanosheet according to Embodiment 1 will be described with reference to FIG. 1A and FIG. 1B.

The bilayer membrane 10 is formed of amphipathic molecules 5. The above-mentioned amphiphile is used as the amphipathic molecules 5. In the present production method, the amphipathic molecules 5 are arranged so that the portion 5A having an affinity for the solvent 3 faces the outside (the solvent 3 side) of the bilayer membrane 10 and the portion 5B having no affinity for the solvent 3 faces the inside of the bilayer membrane 10, and thus the bilayer membrane 10 is formed. That is, in the present production method, the bilayer membrane 10 is formed in such a way that the amphipathic molecules 5 are arranged so that the portion 5A having an affinity for the solvent 3 faces one side and the portion 5B having no affinity for the solvent 3 faces the other side so as to form a monomolecular membrane, and a pair of the monomolecular membranes are disposed with one side having no affinity for the solvent 3 facing each other. In principle, the solvent 3 is almost absent inside the bilayer membrane 10. In FIG. 1A, in the case where the solvent 3 is water, for example, the portion 5A having an affinity for the solvent 3 represents a hydrophilic portion and the portion 5B having no affinity for the solvent 3 represents a hydrophobic portion. In another embodiment, in the case where the solvent 3 is the organic solvent, the portion 5A having an affinity for the solvent 3 represents a hydrophobic portion and the portion 5B having no affinity for the solvent 3 represents a hydrophilic portion.

In a preferable embodiment, polyethylene glycol monoalkyl ether is presented by the above-mentioned Formula (1), where $2<n/m<6$, $2.2<n/m<5$ or $2.4 \leq n/m \leq 4$ may hold, and n may be 12 and m may be 5. Use of such amphipathic molecules makes it possible to form the hyper-swollen lamellar phase preferably. In a preferable embodiment, the content of polyethylene glycol monoalkyl ether ($C_nE_m$) where $2<n/m<6$ is preferably 0.1 to 3.0 mass %, more preferably 0.5 to 2.8 mass %, further preferably 0.8 to 2.4 mass %, and particularly preferably 1.2 to 2.0 mass % in a surfactant solution in which the hyper-swollen lamellar phase is developed.

In another preferable embodiment, polyethylene glycol monoalkyl ether is presented by the Formula (1), where n may be 12 and m may be 6. In this case, the solvent 3 may include water and an organic solvent such as toluene. Such a composition also makes it possible to form the hyper-swollen lamellar phase preferably.

In the method for producing the metal organic framework nanosheet according to the present disclosure, the metal organic framework is formed inside the bilayer membrane 10. The bilayer membrane has a relatively uniform thickness. The amount of the raw material of the nanosheet which can be maintained inside the bilayer membrane is not allowed to exceed a certain value. Since the inside of the bilayer membrane is used as a reaction field, the thickness of the reaction field itself is limited and a thin and homogeneous nanosheet can be formed easily. The method for producing the nanosheet according to the present disclosure forms the nanosheet by a bottom-up technique, and thus it is applicable to a wide range of substances and enables mass-production at low cost.

When the hyper-swollen lamellar phase is formed, a large amount of the solvent 3 is present between a bilayer membrane 10 and one of the adjacent bilayer membranes 10 and thus the bilayer membranes are isolated from each other, making it possible to prevent the metal organic framework from growing three-dimensionally (in the thickness direction).

As shown in FIG. 1B, the metal organic framework nanosheet 1 according to Embodiment 1 is formed inside the bilayer membrane 10. The components common between FIG. 1A and FIG. 1B are indicated by the same reference numerals and signs, and detailed explanations thereof are omitted.

In any of the production methods above, the metal organic framework nanosheet 1 may be separated by removing the bilayer membranes after the sheet-form metal organic framework is formed between the two monolayers constituting the single bilayer membrane. In this description, "removing" includes washing, centrifugal separation, drying, baking, etc. These techniques are not particularly limited and known techniques can be used. As the washing technique, for example, there can be mentioned a technique in which the nanosheet is separated by soaking in a solvent that dissolves the bilayer membranes so as to remove the bilayer membranes.

The metal organic framework to be produced in any of the production methods above may be a metal organic framework containing a highly lipophilic ligand as a component. Also, the metal organic framework to be produced may be the flexible MOF. More specifically, the metal organic framework may be ELM-11 or ELM-13.

The metal organic framework may be a framework that is formed by coordinate bonding occurring continuously between the metal ions and the organic ligands.

As the solvent 3, water can be used, for example. However, the solvent 3 is not limited to water. For example, the solvent 3 may be an organic solvent (such as a nonpolar solvent), and the bilayer membrane may be formed in such a manner that hydrophobic portions of the amphipathic molecules face outside and hydrophilic portions of the amphipathic molecules face inside. The combination of the solvent and the amphipathic molecules to be mixed together is changed, so that the hydrophobic portion and the hydrophilic portion of the bilayer membrane are disposed as mentioned above. In this case, a hydrophilic ligand can be used to form the metal organic framework nanosheet.

As shown in FIG. 1A, the metal organic framework nanosheet 1 may be formed inside the bilayer membranes 10 forming a hyper-swollen lamellar phase.

As other methods for producing the nanosheet, there can be mentioned a method for producing a metal oxide nanosheet and a method for producing a metal nanosheet.

As a preferable embodiment of the method for producing the metal oxide nanosheet, there can be mentioned a method for producing the metal oxide nanosheet wherein the bilayer membranes are formed in the solvent, an amphiphile is added in the solvent to form the hyper-swollen lamellar phase formed of the bilayer membranes, and a metal-containing compound having an oxygen atom is then added in the solvent to form the metal nanosheet between the two monolayers constituting the single bilayer membrane. As a preferable embodiment of the method for producing the metal nanosheet, there can be mentioned a method for producing the metal nanosheet wherein the bilayer membranes are formed in the solvent, an amphiphile is added in the solvent to form the hyper-swollen lamellar phase formed of the bilayer membranes, and a metal-containing compound having no oxygen atom is then added in the solvent to form the metal nanosheet between the two monolayers constituting the single bilayer membrane. In the method for producing the metal oxide nanosheet and the method for producing the metal nanosheet, the hydrophobic portion faces the solvent side, and thus the nanosheet is formed between the respective hydrophilic portions of the two monolayers constituting the single bilayer membrane. The combination of the solvent and the amphipathic molecules to be mixed together is changed, so that the hydrophobic portion and the hydrophilic portion of the bilayer membrane are disposed as described above. In the method of the Non-Patent Literature 1, a lamellar phase of hydrogel is used to produce a gold nanosheet, allowing reactions to occur only in a hydrophilic field. In contrast, in the present disclosure, the nanosheet is formed between the portions 5B having no affinity for the solvent 3, making it possible to produce the nanosheet not only in a hydrophilic reaction field but also in a hydrophobic reaction field in accordance with the type of the solvent.

As the solvent to be used in the preferable embodiments of the method for producing the metal oxide nanosheet and the method for producing the metal nanosheet, an organic solvent is preferable. The organic solvent may be a hydrocarbon-based solvent. As the hydrocarbon-based solvent, there can be mentioned: an aliphatic hydrocarbon-based solvent such as cyclohexane, methylcyclohexane, n-pentane, n-hexane, n-heptane, n-octane, n-nonane, n-decane, n-dodecane and bicyclohexyl; and an aromatic hydrocarbon-based solvent such as toluene, xylene, mesitylene, ethylbenzene, n-hexylbenzene and cyclohexylbenzene. The solvent may be the hydrocarbon-based solvent alone, or a combination of the hydrocarbon-based solvent and another organic solvent. Examples of the other organic solvent include: a ketone-based solvent such as acetone, acetylacetone, methyl ethyl ketone, cyclohexanone and acetophenone; an alcoholic solvent such as methanol, ethanol, n-propanol, isopropyl alcohol, cyclohexanol, ethylene glycol, diethylene glycol, propylene glycol and glycerin; a chlorine-based solvent such as 1,2-dichloroethane, 1,1,2-trichloroethane, chlorobenzene and o-dichlorobenzene; and an ether-based solvent such as tetrahydrofuran, dioxane, anisole and 4-methyl anisole. In the case of using, as the solvent, the hydrocarbon-based solvent and the other organic solvent, the mass ratio between them, that is, the hydrocarbon-based solvent:the other organic solvent, is preferably 80:20 to 99.99:0.01, and more preferably 85:15 to 99.9:0.1. In preferable embodiments of these production methods, water may be included. For example, in the case where the solvent includes the hydrocarbon-based solvent and water (preferably, the amphiphile is, furthermore, an anionic amphiphile), the mass ratio between them, that is, the hydrocarbon-based solvent:the other organic solvent, is preferably 85:15 to 99.99:0.01, and more preferably 90:10 to 99.9:0.1. In these preferable embodiments, the solvent may be a mixed solution of water and the organic solvent. Furthermore, in another preferable embodiment, there may be used, as the solvent: an aqueous acidic solution such as hydrochloric acid, nitric acid and sulfuric acid; and a basic aqueous solution such as a sodium hydroxide aqueous solution, instead of water or in addition to water in accordance with the type of reaction to occur when a target nanosheet is synthesized.

In the preferable embodiments of the method for producing the metal oxide nanosheet and the method for producing the metal nanosheet, the amphiphile may be an anionic amphiphile. Examples of the anionic amphiphile include a sulfonic acid type surfactant, a sulfate type surfactant, a carboxylic acid type surfactant and a phosphate type surfactant. Examples of the sulfonic acid type surfactant include: α-sulfofatty acid ester salt such as sodium α-sulfo methyl myristate, sodium α-sulfo methyl stearate and α-sulfo fatty acid methyl ester salt ($CH_3(CH_2)_sCH(SO_3Na)COOCH_3$) where s may be 8 to 20); alkylbenzene sulfonate salt such as sodium p-toluenesulfonate, sodium cumenesulfonate, sodium octylbenzenesulfonate and sodium dodecylbenzenesulfonate; alkane sulfonate salt such as sodium hexylsulfonate, sodium octylsulfonate, sodium decylsulfonate, sodium dodecylsulfonate, sodium tetradecylsulfonate, sodium hexadecylsulfonate and sodium stearylsulfonate; and α-olefin sulfonate salt having 8 to 26 carbon atoms. Examples of the sulfate type surfactant include: $R^1$—$OSO_3Na$ ($R^1$=a saturated hydrocarbon group having 8 to 18 carbon atoms or an unsaturated hydrocarbon group having one double bond) such as sodium hexylsulfate, sodium octylsulfate, sodium decylsulfate, sodium dodecylsulfate, sodium tetradecylsulfate, sodium hexadecylsulfate, sodium stearylsulfate and sodium laurethsulfate; polyoxyethylene alkyl ether sulfuric ester salt; fatty acid monoglyceride sulfuric ester salt such as lauric acid sodium monoglyceride sulfate; and fatty acid alkanolamide sulfuric ester salt such as $R^2CONHCH_2CH_2OSO_3Na$ ($R^2$=fatty acid having 7 to 20 carbon atoms). Examples of the carboxylic acid type surfactant include: alkyloyl sarcosines such as sodium octanoate, sodium decanoate, sodium laurate, sodium oleate, sodium myristate, sodium palmitate, sodium stearate, potassium laurate, potassium oleate, perfluorooctanoic acid, perfluorononanoic acid and sodium N-lauroylsarcosinate; and sodium cocoyl glutamate ($HOOCCH_2CH_2CH(NHCOR^3)COONa$) where $R^3$ denotes an alkyl group having 11 to 17 carbon atoms. Examples of the phosphate type surfactant include: lauryl phosphate; sodium monoalkyl phosphate such as sodium lauryl phosphate, sodium hexyl phosphate, sodium octyl phosphate, sodium decyl phosphate, sodium dodecyl phosphate, sodium tetradecyl phosphate and sodium hexadecyl phosphate; potassium monoalkyl phosphate such as potassium lauryl phosphate, potassium hexyl phosphate, potassium octyl phosphate, potassium decyl phosphate, potassium dodecyl phosphate, potassium tetradecyl phosphate and potassium hexadecyl phosphate; polyoxyethylene alkyl ether phosphate; and sodium polyoxyethylene alkyl ether phosphate such as sodium polyoxyethylene lauryl ether phosphate and sodium polyoxyethylene tridecyl ether phosphate. The anionic amphiphiles mentioned above preferably have an alkyl group having 8 to 20 carbon atoms.

In the preferable embodiments of the method for producing the metal oxide nanosheet and the method for producing the metal nanosheet, the solvent may contain a surface-active auxiliary to stabilize the amphiphile. Examples of the surface-active auxiliary include monohydric alcohol, and glycol-based polyhydric alcohol and derivatives thereof. Examples of the monohydric alcohol include: monohydric alcohol having 1 to 10 carbon atoms such as ethanol, n-propanol, isopropanol, n-butanol, sec-butanol, isobutyl alcohol, tert-butyl alcohol, 1-pentanol, 2-pentanol, 3-pentanol, 2-methyl-1-butanol, isopentyl alcohol, tert-pentyl alcohol, 3-methyl-2-buthanol, neopentyl alcohol, 1-hexanol, 1-heptanol, 1-octanol, 1-nonanol, 1-decanol, 2-methyl-1-pentanol, 4-methyl-2-pentanol, 2-ethyl-1-butanol, 2-heptanol, 3-heptanol, 2-octanol, 2-ethyl-1-hexanol and 3,5,5-trimethyl-1-hexanol; and cholesterol such as cholesterol, cholesteryl alkenylsuccinate, cholestanol, cholesteryl ester having 12 to 36 carbon atoms (preferably 14 to 28 carbon atoms) and having a saturated or unsaturated, linear or branched hydrocarbon group and dehydrocholesterol, and derivatives thereof. Examples of the glycol-based polyhydric alcohol and derivatives thereof include: glycol ethers such as ethylene glycol monomethyl ether, ethylene glycol monoethyl ether, ethylene glycol monobutyl ether, propylene glycol-1-methyl ether, ethylene glycol diethyl ether, ethylene glycol dimethyl ether, diethylene glycol monomethyl ether, diethylene glycol monoethyl ether, diethylene glycol monobutyl ether, diethylene glycol dimethyl ether, diethylene glycol diethyl ether and triethylene glycol dimethyl ether; glycol ether acetates such as ethylene glycol methyl ether acetate and diethylene glycol ethyl ether acetate; diols such as ethylene glycol, propylene glycol, 1,3-butylene glycol, diethylene glycol, dipropylene glycol and hexylene glycol; and polyols such as glycerin, pentaerythritol and sorbitol.

In preferable embodiments of the method for producing the metal oxide nanosheet and the method for producing the metal nanosheet, the solvent may include the hydrocarbon-based solvent and water, the amphiphile may be the anionic amphiphile, and furthermore, the solvent may contain the surface-active auxiliary. In these production methods, when a mixed solvent containing water is used, the content of water is not particularly limited. It is preferably 5 mass % or less, more preferably 2.0 mass % or less, and further preferably 1.5 mass % or less in the solvent.

Examples of the metal-containing compound having an oxygen atom used in the method for producing the metal oxide nanosheet include metal alkoxide such as tetraethoxysilane (TEOS), titanium(IV) isopropoxide, germanium ethoxide, niobium(V) ethoxide and aluminium ethoxide. Silicon is classified as a semimetal in some cases, but it is defined as a metal in this description. Examples of the metal oxide constituting the nanosheet to be obtained by the above-mentioned production method include silica, titanium oxide, niobium oxide and alumina.

Examples of the metal-containing compound having no oxygen atom used, as a raw material, in the method for producing the metal nanosheet include a gold-containing compound having no oxygen atom, and a nickel-containing compound having no oxygen atom. Examples of the gold-containing compound having no oxygen atom include hydrogen tetrachloroaurate(III) tetrahydrate from the viewpoint that an $Au(OH)_4$-complex, which is easily photoreduced, can be produced. In the case where the metal is gold in the method for producing the metal nanosheet, that is, in the method for producing a gold nanosheet, it is preferable to use, as a protective agent, iron(III) chloride ($FeCl_3$), sodium chloride, copper chloride ($CuCl_2$), sodium nitrate, polyvinyl pyrrolidone, etc. in addition to the raw material gold-containing compound having no oxygen atom. These production methods shorten the reaction time, making it possible to produce a thinner nanosheet.

In the case where the metal is gold in the method for producing the metal nanosheet, that is, in the method for producing a gold nanosheet, it is preferable to perform energy irradiation such as supersonic wave, photoirradiation (ultraviolet rays, visible rays) and γ irradiation. For example, irradiation by ultraviolet rays having a wavelength of approximately 350 nm makes it possible to obtain gold nanoparticles. Since the gold nanoparticles are formed between the two monolayers constituting the single bilayer membrane in the hyper-swollen lamellar phase, the gold nanosheet can be produced. The duration of the energy irradiation may be approximately 10 minutes to 15 hours, for example. Furthermore, the metal nanosheet may be separated by removing the bilayer membrane after the metal nanosheet is formed. The removal can be carried out by the same techniques as those used to separate the metal organic framework nanosheet described above.

Embodiment 4

As another embodiment according to the present disclosure, there can be mentioned a gas separation membrane including any of the metal organic framework nanosheets described above. The gas separation membrane may be for nitrogen separation or carbon dioxide separation. The gas separation membrane may be a multilayer structure configured by stacking any of the aforementioned metal organic framework nanosheets, or a composite structure configured by stacking any of the metal organic framework nanosheets and a known gas separation membrane. The thickness of the gas separation membrane may vary depending on its purpose.

Embodiment 5

As another embodiment according to the present disclosure, there can be mentioned a metal oxide nanosheet including a metal oxide disposed, in a sheet form, between two monolayers constituting a single bilayer membrane, wherein a plurality of the bilayer membranes forms a hyper-swollen lamellar phase in a solvent. Furthermore, as another embodiment according to the present disclosure, there can be mentioned a metal nanosheet (such as a gold nanosheet and a nickel nanosheet) including a metal (such as gold and nickel) disposed, in a sheet form, between two monolayers constituting a single bilayer membrane, wherein a plurality of the bilayer membranes forms a hyper-swollen lamellar phase in a solvent. As another embodiment, there can be mentioned a composite nanosheet including the metal oxide nanosheet and the bilayer membrane composed of the amphiphile. Also, there can be mentioned a composite nanosheet including the metal nanosheet and a bilayer membrane composed of an amphiphile.

The present invention includes embodiments which are combinations of various compositions described above within the technical scope of the present invention as long as the effects of the present invention are achieved.

EXAMPLES

Next, the embodiments according to the present disclosure will be described in more detail with reference to examples. The present disclosure is not limited in any way by these examples. Many modifications can be made, within the technical idea of the present disclosure, by persons who have common knowledge in this technical field.

Observation on Shape, Etc.

Atomic force microscope: NanoScope III TappingMode AFM available from TOYO Corporation
Scanning electron microscope (SEM): S-5000 available from Hitachi, Ltd.
Transmission electron microscope (TEM): H-800 available from Hitachi, Ltd.

X-ray Diffraction Spectrum Measurement

X-ray diffractometer: MiniFlex II diffractometer available from Rigaku Corporation
X-ray source: CuKα
Tube voltage: 30 kV
Tube current: 15 mA Gas Adsorption Amount Measurement High-precision gas/vapor adsorption measurement instrument: BELSORP-max available from MicrotracBEL Corp.
Measurement temperature: 77K
Adsorption gas purity: 99.99 vol % for both nitrogen and carbon dioxide Pretreatment of Test Sample A sample was weighed to approximately 30 mg and allowed to stand still under vacuum ($P<10^{-4}$ Pa) at 373K for 2 hours.

Example 1

The metal organic framework nanosheet including ELM-11 ($[Cu(bpy)_2(BF_4)_2]$) as the metal organic framework was prepared by the following method.

Figure 3A:
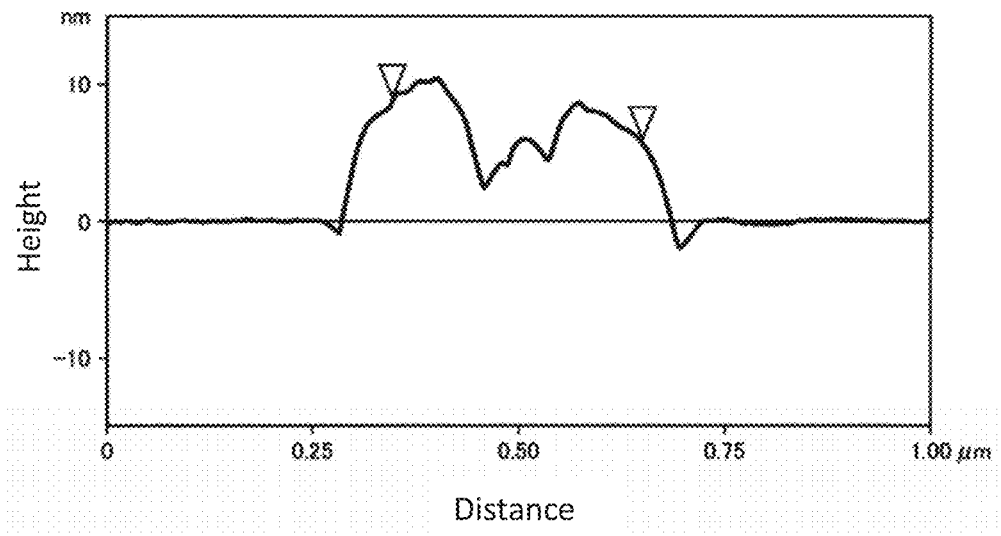
FIG. 3A shows a measurement result of a thickness of the metal organic framework nanosheet according to Example 1 with an atomic force microscope.
Figure 3B:
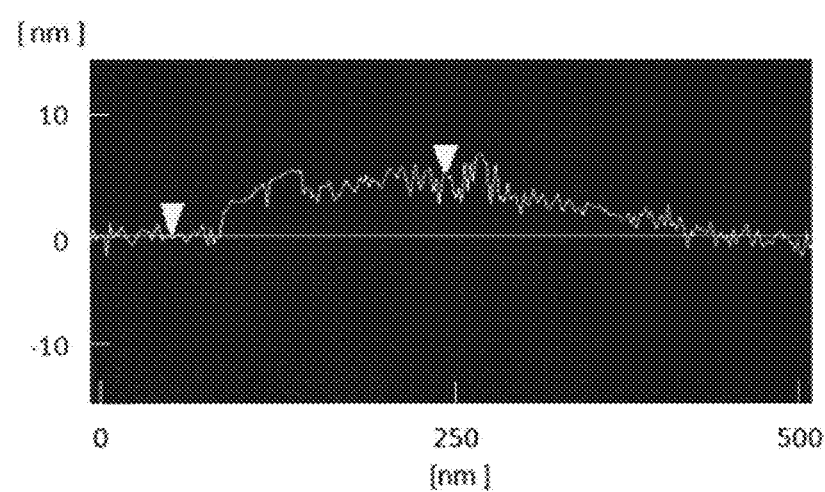
FIG. 3B shows a measurement result of a thickness of the metal organic framework nanosheet according to Example 1 with an atomic force microscope.

A surfactant solution was prepared by mixing 4,4'-bipyridine (available from Wako Pure Chemical Corporation) and $C_{12}E_6$ (available from Wako Pure Chemical Corporation) in a 20 mL screw cap bottle (available from AS ONE Corporation) so that 4,4'-bipyridine had a concentration of 12.2 mass %. The surfactant solution and water were mixed together at 2:98 (mass ratio). The aqueous solution thus prepared was stirred at 300 rpm while heated to 54° C. with a hot stirrer and a magnetic stirrer that was 20 mm in length and 7 mm in diameter. It was confirmed that a hyper-swollen lamellar phase was maintained stably therein. Then 1 mL of a 2.5-mass % aqueous solution of $Cu(BF_4)_2 \cdot 6H_2O$ (available from Tokyo Chemical Industry Co., Ltd.) was added thereto. The resulting mixture was stirred under sustained ordinary temperature for 10 minutes to obtain a dispersion. Thereafter, the dispersion was dried at 90° C. for one night and a remaining solid was washed with ethanol several times to remove the surfactant. Then, a nanosheet of ELM-11 (hereinafter referred to as an ELM-11 nanosheet) was obtained by centrifugal separation. Observing the resulting powder with the transmission electron microscope and the atomic force microscope, it was confirmed that a flaky nanosheet was obtained. The obtained ELM-11 nanosheet was observed with the atomic force microscope. FIG. 2A, FIG. 3A, FIG. 2B and FIG. 3B show the observation results. FIG. 3A shows a cross section cut along the vertical line in FIG. 2A. FIG. 3B shows a cross section cut along the vertical line in FIG. 2B. The arrows in FIG. 2A correspond respectively to the arrows in FIG. 3A, and the arrows in FIG. 2B correspond respectively to the arrows in FIG. 3B.

As shown in FIG. 3A and FIG. 3B, the ELM-11 nanosheet had an irregular shape that was 200 to 300 nm in width and length, and it was as extremely thin as 10 nm or less.

Figure 4:
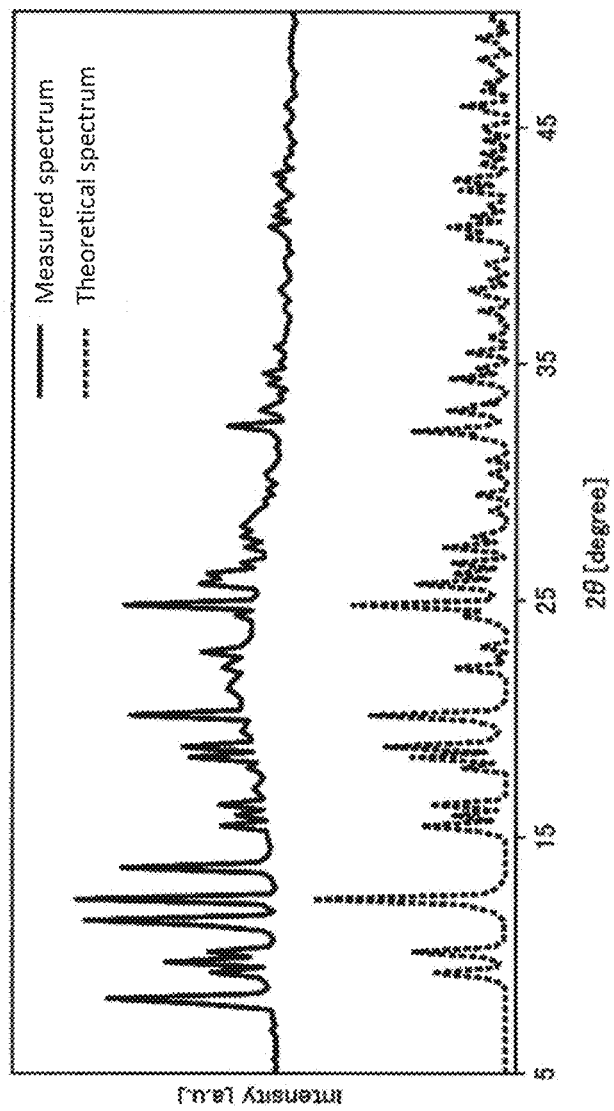
FIG. 4 shows X-ray diffraction spectra of the metal organic framework nanosheet according to Example 1.

Next, the obtained ELM-11 nanosheet was measured for X-ray diffraction spectrum by the above-mentioned method. FIG. 4 shows the result.

In FIG. 4, the upper line shows the measured spectrum and the lower line shows a theoretical spectrum. As shown in FIG. 4, the spectrum of the ELM-11 nanosheet is well consistent with the theoretical spectrum calculated from bulk ELM-11, and it was confirmed that the ELM-11 nanosheet was obtained.

Figure 5:
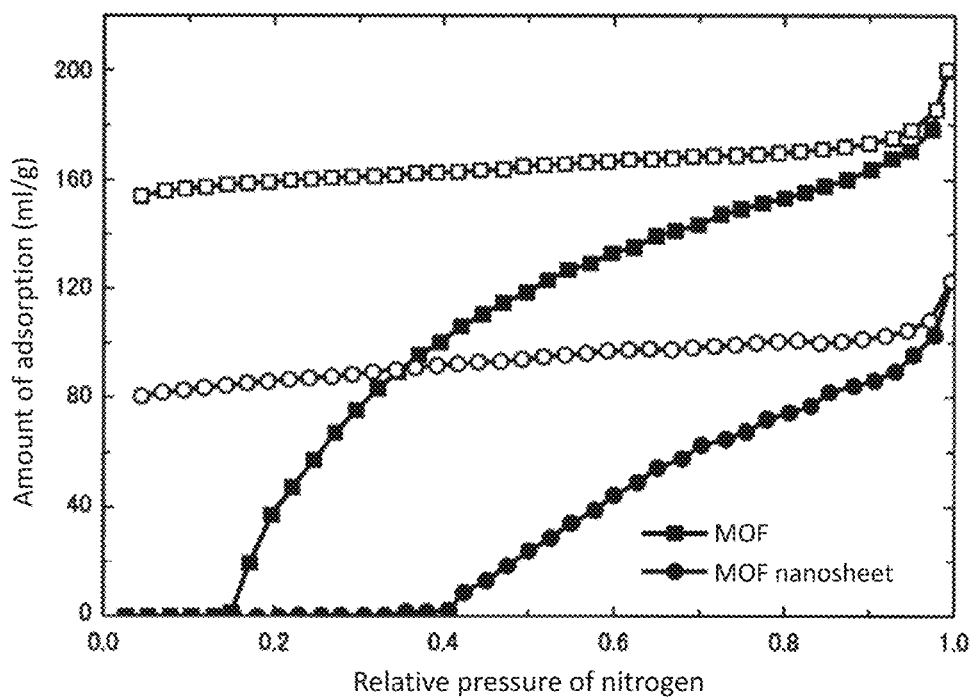
FIG. 5 is a graph showing a relationship between the relative pressure of nitrogen and the amount of nitrogen adsorbed to the metal organic framework nanosheet according to Example 1.

The amounts of nitrogen adsorbed to the ELM-11 nanosheet and bulky ELM-11 (hereinafter referred to as bulk ELM-11, available from Tokyo Chemical Industry Co., Ltd.) as an object for comparison were measured by the above-mentioned method. FIG. 5 shows the results.

The vertical axis in FIG. 5 indicates the value obtained by converting the amount of adsorbed nitrogen gas ($N_2$) per unit mass into the volume of nitrogen gas ($N_2$) at a standard temperature and a standard pressure (STP). In FIG. 5, ■ indicates the amount of nitrogen adsorbed to the bulk ELM-11 while the relative pressure of nitrogen was being increased, □ indicates the amount of nitrogen adsorbed to the bulk ELM-11 while the relative pressure of nitrogen was being decreased, ● indicates the amount of nitrogen adsorbed to the ELM-11 nanosheet while the relative pressure of nitrogen was being increased, and ○ indicates the amount of nitrogen adsorbed to the ELM-11 nanosheet while the relative pressure of nitrogen was being decreased.

As shown in FIG. 5, on the metal organic framework nanosheet, the rising point of the nitrogen adsorption amount shifted further to the right than on the bulk metal organic framework as the relative pressure of the nitrogen increases. That is, on the metal organic framework nanosheet, the gate-opening pressure for nitrogen adsorption shifted to a higher value. In other words, by making the metal organic framework into a nanosheet, it is expected to be possible to control the amount of nitrogen adsorption at a higher pressure.

Figure 6:
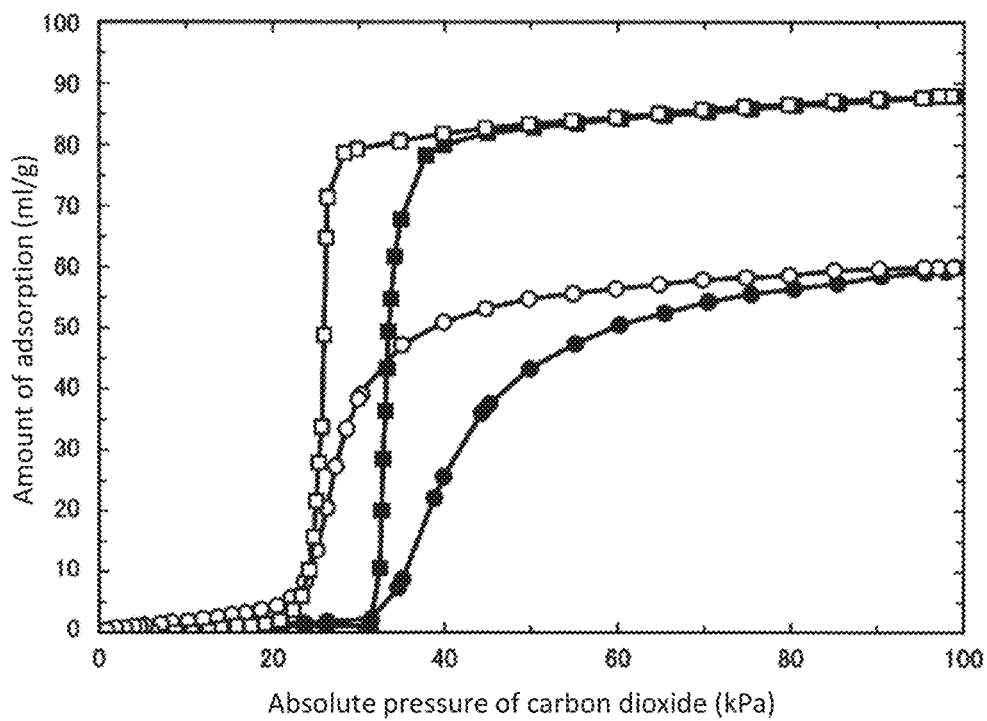
FIG. 6 is a graph showing a relationship between the absolute pressure of carbon dioxide and the amount of carbon dioxide adsorbed to the metal organic framework nanosheet according to Example 1.
Figure 7:
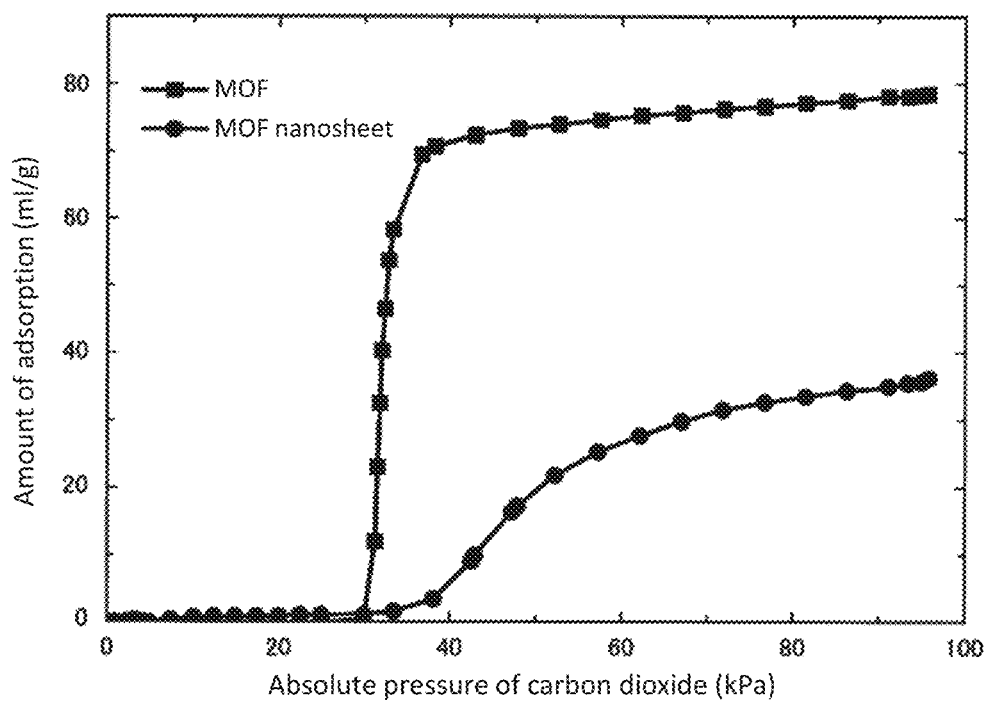
FIG. 7 is a graph showing the relationship between the absolute pressure of carbon dioxide and the amount of carbon dioxide adsorbed to the metal organic framework nanosheet according to Example 1.

Next, the amount of carbon dioxide adsorbed to the ELM-11 nanosheet was measured by the same method as the one used above to measure the amount of nitrogen absorbed. FIG. 6 and FIG. 7 show the results. The vertical axis indicates the amount of the adsorbed carbon dioxide measured by the same method as shown in FIG. 5. In FIG. 6, ■ indicates the amount of carbon dioxide adsorbed to the bulk ELM-11 while the absolute pressure of carbon dioxide was being increased, □ indicates the amount of carbon dioxide adsorbed to the bulk ELM-11 while the absolute pressure of carbon dioxide was being decreased, ● indicates the amount of carbon dioxide adsorbed to the ELM-11 nanosheet while the absolute pressure of carbon dioxide was being increased, and ○ indicates the amount of carbon dioxide adsorbed to the ELM-11 nanosheet while the absolute pressure of carbon dioxide was being decreased. To simplify, FIG. 7 only shows the graphs taken in the cases where the absolute pressure of the carbon dioxide was increased.

As shown in FIG. 6 and FIG. 7, the metal organic framework nanosheet was different from the bulk metal organic framework in the way the amount of carbon dioxide adsorption rose when the absolute pressure of carbon dioxide was increased, that is, in the inclination of the graph. This reveals that the metal organic framework nanosheet contains particles that exhibit a gate-opening pressure for carbon dioxide adsorption higher than that of the bulk metal organic framework while also containing particles that exhibit a gate-opening pressure equivalent to that of the bulk metal organic framework. In FIG. 6, it is presumed that there is a variation in the shape and size of the particles constituting the metal organic framework nanosheet, and some of the particles have a high gate-opening pressure. This leads to a finding that it is possible to shift the gate-opening pressure for carbon dioxide adsorption to a higher value on the metal organic framework nanosheet than on the non-nanosheet metal organic framework. In other words, by making the metal organic framework into a nanosheet, it is expected to be possible to control the amount of carbon dioxide adsorption at a higher pressure.

Example 2

A nanosheet (hereinafter referred to as an ELM-13 nanosheet) including ELM-13 as the metal organic framework and ELM-13 (hereinafter referred to as bulk ELM-13), which is a bulky metal organic framework, were prepared, and both were measured for pressure dependence of the nitrogen adsorption amount.

The ELM-13 nanosheet was prepared by the following method. 4,4'-bipyridine and $C_{12}E_6$ were mixed together as in Example 1. It was confirmed that a hyper-swollen lamellar phase was maintained stably therein. Then, 1 mL of an aqueous solution obtained by preparing 2.2 mass % of $Cu(BF_4)_2 \cdot 6H_2O$ and 3.3 mass % of $KCF_3BF_3$ (available from Tokyo Chemical Industry Co., Ltd.) was added thereto. The ELM-13 nanosheet having a thickness of 10 to 20 nm was obtained by the same method as in Example 1.

The bulk ELM-13 was prepared by the following method. A $Cu(BF_4)$ aqueous solution (80 mM, 6.25 mL) was put into a test tube, and $KCF_3BF_3$ (1.0 mmol) was added thereto and dissolved. An acetone solution (80 mM, 12.5 mL) of 4,4'-bipyridine (bpy) was dropped slowly thereto to stack ELM-13. After allowing this to stand still for two weeks, blue crystals precipitated were filtrated under reduced pressure and dried under reduced pressure, so that crystals of blue polymer metal complex were obtained.

Figure 8:
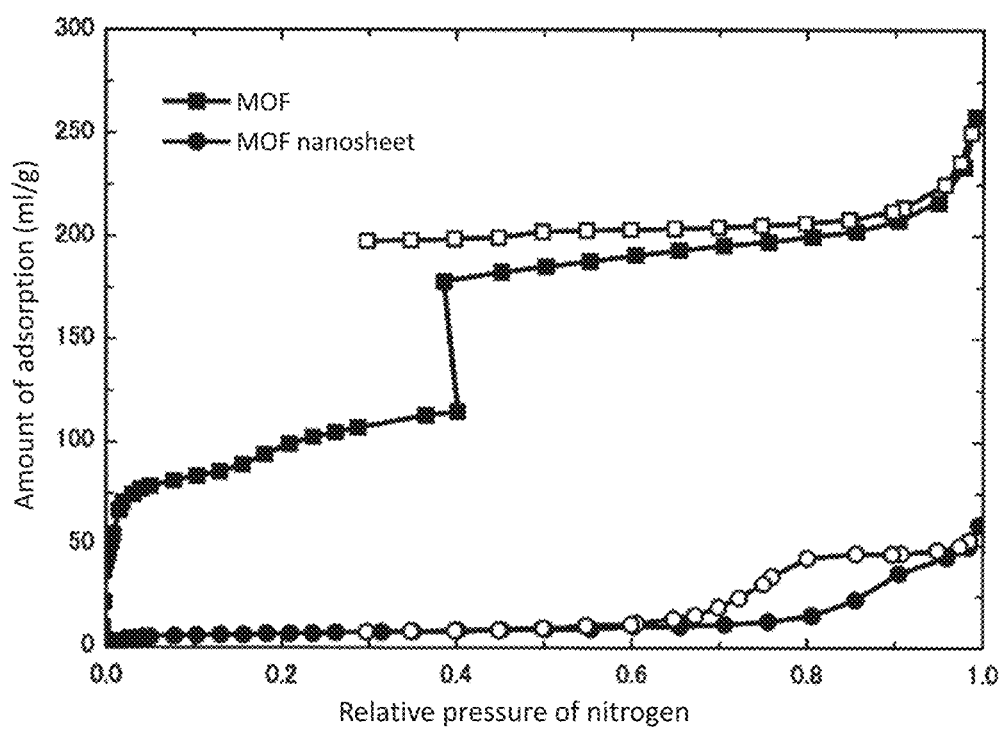
FIG. 8 is a graph showing a relationship between the relative pressure of nitrogen and the amount of nitrogen adsorbed to a metal organic framework nanosheet according to Example 2.

The ELM-13 nanosheet and the bulk ELM-13 obtained by the above-mentioned methods were measured for pressure dependence of the nitrogen adsorption amount as in Example 1. FIG. 8 shows the results.

In FIG. 8, ■ indicates the amount of nitrogen adsorbed to the bulk ELM-13 while the relative pressure of nitrogen was being increased, □ indicates the amount of nitrogen adsorbed to the bulk ELM-13 while the relative pressure of nitrogen was being decreased, ● indicates the amount of nitrogen adsorbed to the ELM-13 nanosheet while the relative pressure of nitrogen was being increased, and ○ indicates the amount of nitrogen adsorbed to the ELM-13 nanosheet while the relative pressure of nitrogen was being decreased.

As shown in FIG. 8, the metal organic framework nanosheet was different from the bulk metal organic framework in the way the amount of nitrogen adsorption rose when the relative pressure of nitrogen was increased, that is, in the inclination of the graph. This reveals that the metal organic framework nanosheet contains particles that exhibit a gate-opening pressure for nitrogen adsorption higher than that of the bulk metal organic framework while also containing particles that exhibit a gate-opening pressure equivalent to that of the bulk metal organic framework. In FIG. 8, it is presumed that there is a variation in the shape and size of the particles constituting the metal organic framework nanosheet, and some of the particles have a high gate-opening pressure. This leads to a finding that it is possible to shift the gate-opening pressure for nitrogen adsorption to a higher value on the ELM-13 nanosheet than on the bulk ELM-13. The observed gate-opening pressure of the ELM-13 nanosheet is the highest of the gate-opening pressures currently confirmed for nitrogen absorption at 273K.

Experiment 1

The occurrence of the formation of the hyper-swollen lamellar phase was studied in the case where the number of carbon atoms in an alkyl group in a hydrophobic portion and the number of ethylene oxides in a hydrophilic portion varied in polyethylene glycol monoalkyl ether ($C_nE_m$).

A surfactant solution was prepared, and the surfactant solution and water were mixed together at 2:98 (mass ratio) to prepare a solution in the same manner as in Example 2, except that $C_{12}E_5$ was used instead of $C_{12}E_6$. The solution thus prepared was stirred at 54° C. and 300 rpm for 24 hours to form a hyper-swollen lamellar phase. As shown in FIG. 9, white light was emitted from a light source 22 toward a side of a screw cap bottle 20, and the light reflected at an angle of approximately 24 degrees was collected with a spectroscope 24 to analyze its spectrum. This reflection spectrum measurement was conducted on the solution in which the hyper-swollen lamellar phase was formed, while the solution was being stirred at 300 rpm and while the solution was allowed to stand still (0 rpm). FIG. 10 shows the results.

FIG. 10 shows that the peak position of the reflection spectrum shifted to the low wavelength side as the concentration of the surfactant (polyethylene glycol monoalkyl ether $C_{12}E_5$) in the solution increased. That is, this reflection spectrum is Bragg reflection caused by the periodic structure of the hyper-swollen lamellar phase. Therefore, it can be said that the hyper-swollen lamellar phase was developed.

Separate from the experiment described above, solutions were prepared using polyethylene glycol monoalkyl ethers ($C_nE_m$) (all available from Wako Pure Chemical Corporation) represented by the Formula (1) where n and m were respectively the values specified in the table of FIG. 11 so that the $C_nE_m$ content in deionized water was 1.2 to 2.0 mass %. Then, the containers accommodating the respective solutions were shaken strongly. Thereafter, the occurrence of the formation of the hyper-swollen lamellar phase was checked by the above-mentioned method. FIG. 11 shows the results.

As shown in FIG. 11, the hyper-swollen lamellar phase was formed when n/m in accordance with the Formula (1) was more than 2 and less than 6, but the hyper-swollen lamellar phase failed to be formed when n/m was 2 or less and when n/m was 6 or more.

Experiment 2

In Experiment 2, the forming temperatures of the hyper-swollen lamellar phase were compared in the case where the number of carbon atoms in an alkyl group in a hydrophobic portion and the number of ethylene oxides in a hydrophilic portion varied in polyethylene glycol monoalkyl ether ($C_nE_m$).

Figure 12:
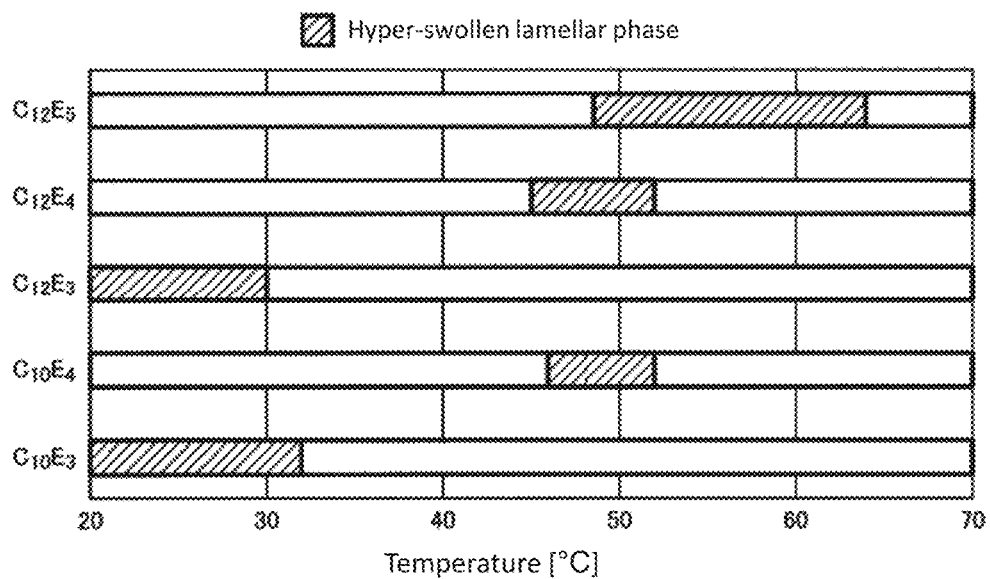
FIG. 12 is a chart showing a relationship between the composition of polyethylene glycol monoalkyl ether ($C_nE_m$ where $C_n$ and $E_m$ relatively have the same meanings as above), which is a nonionic amphiphile, and the forming temperature of the hyper-swollen lamellar phase.

The experiment was conducted by using $C_{12}E_5$ and changing temperature with a hot stirrer in the same manner as in Experiment 1 shown in FIG. 11 in which the occurrence of the formation of the hyper-swollen lamellar phase was studied. For the other types of $C_nE_m$, literature values were adopted. Specifically, for $C_{12}E_4$, R. Strey, Ber. Bunsenges. Phys. Chem., 100, 182 (1996) was referred to. For $C_{12}E_3$, P.-G. Nilsson, B. Lindman, J. Phys. Chem., 88, 4764 (1984) was referred to. For $C_{10}E_4$, C. Stubenrauch, S. Burauer, R. Strey, Liquid Crystals, 31, 39 (2004) was referred to. For $C_{10}E_3$, A. A. Ali, B. A. Mulley, J. Pharm. Pharmac., 30, 205 (1978) was referred to. FIG. 12 shows the results.

For example, the method shown in Experiment 2 makes it possible to form nanosheets by using the hyper-swollen lamellar phases of the metal organic frameworks having different forming temperatures.

Experiment 3

Experiment 3 was carried out to study the conditions regarding the toluene and $C_{12}E_6$ contents in order for polyethylene glycol monoalkyl ether ($C_{12}E_6$) to form the hyper-swollen lamellar phase in a toluene-water solvent.

Figure 13:
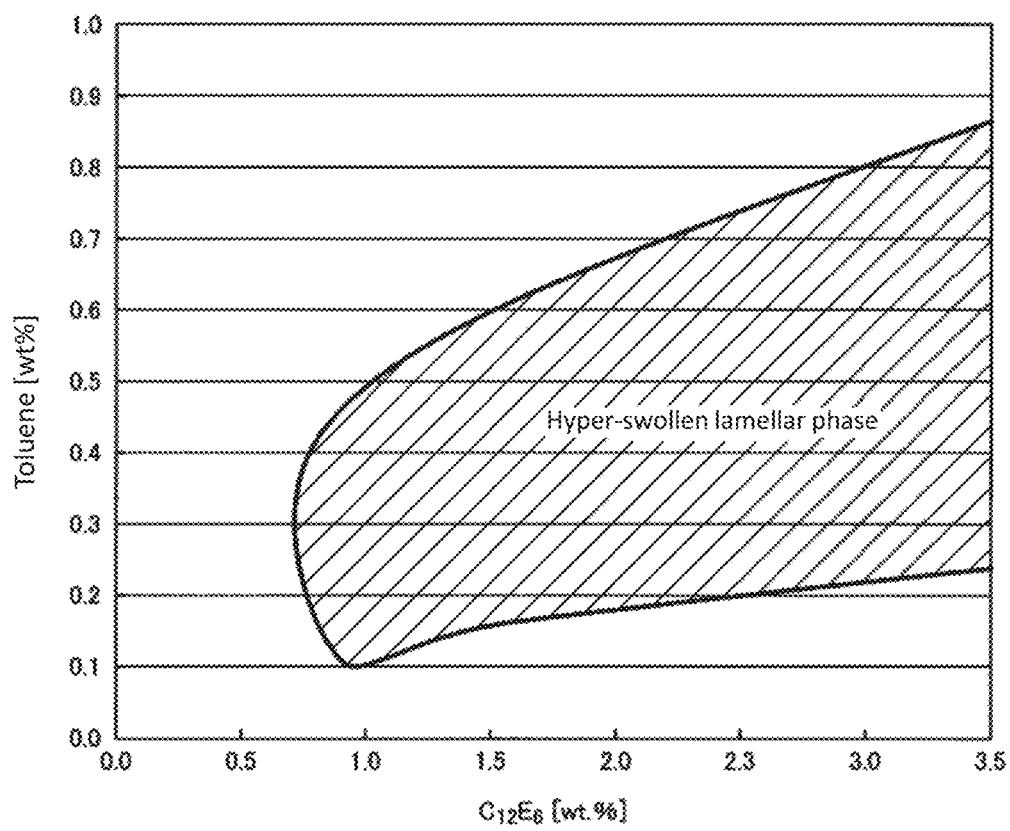
FIG. 13 is a phase diagram in the case with $C_{12}E_6$ and a toluene-water solvent.

$C_{12}E_6$, toluene as hydrophobic molecules, and deionized water were mixed together in a 20 mL screw cap bottle at various concentrations shown in FIG. 13 to prepare solutions, each of which is 10 g in total. At that time, the preparations were made so that $C_{12}E_6$ and toluene were present at a fixed mass ratio ($C_{12}E_6$:toluene=5:1). The solutions each were measured for reflection spectrum for characterization. The reflection spectrum measurement was conducted while the solutions were being heated to 54° C. and stirred at 300 rpm with a hot stirrer and a magnetic stirrer that was 20 mm in length and 7 mm in diameter. Solutions obtained by mixing $C_{12}E_6$ and styrene together at various ratios were also observed, in which styrene was used as hydrophobic molecules. FIG. 13 shows the results.

As shown in FIG. 13, it was found that the content of toluene can impact the occurrence of the formation of the hyper-swollen lamellar phase even when the content of $C_{12}E_6$ was fixed.

Experiment 4

In Experiment 4, the forming temperatures of the hyper-swollen lamellar phase were compared in the case where glycerin was added to polyethylene glycol monoalkyl ether ($C_{12}E_5$ or $C_{12}E_6$).

Formation of Hyper-Swollen Lamellar Phase Composed of $C_{12}E_5$-Glycerin-Water Three Component System $C_{12}E_5$, glycerin and deionized water were mixed together in a 20 mL screw cap bottle to prepare solutions having various glycerin concentrations. Each of the solutions was observed for color change while being stirred and heated. Also, the solutions were measured, in the same manner as with the $C_{12}E_5$ aqueous solution, for reflection spectrum at temperatures at which the solutions exhibited a color. Any solutions in which $C_{12}E_5$ has a concentration of 2 mass % were measured for viscosity as well.

Figure 14:
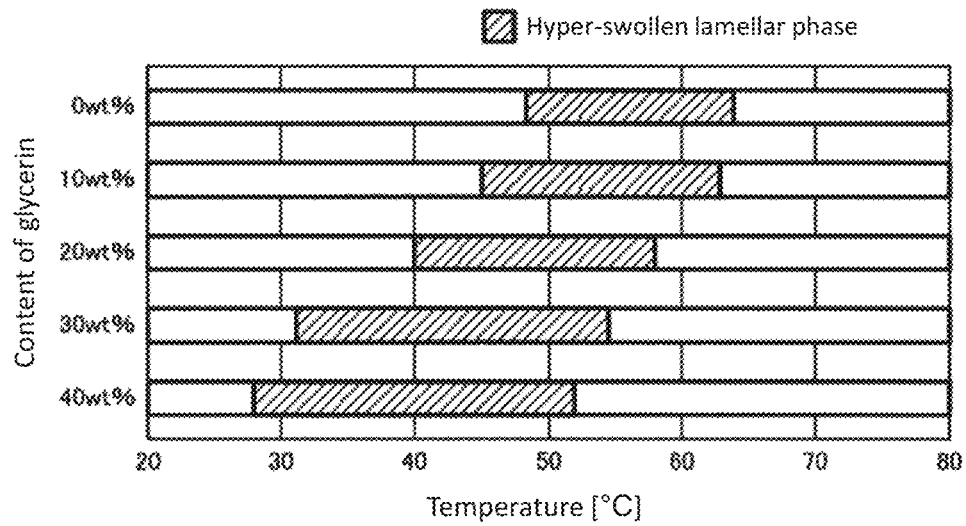
FIG. 14 is a chart showing the effect of the addition of glycerin to $C_{12}E_5$ has on the forming temperature of the hyper-swollen lamellar phase.
Figure 15:
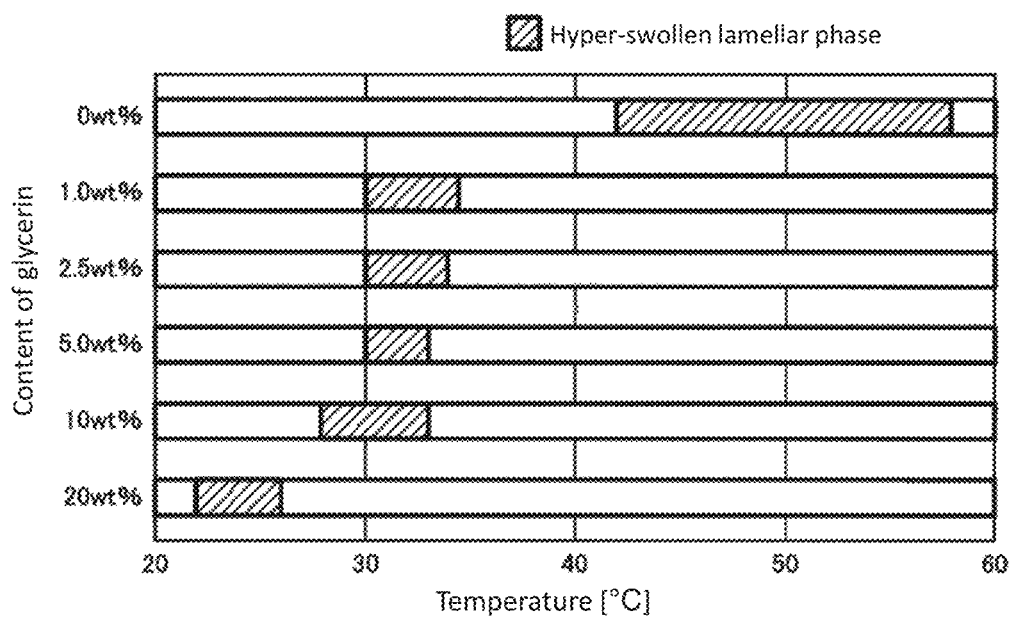
FIG. 15 is a chart showing the effect of the addition of glycerin to $C_{12}E_6$ has on the forming temperature of the hyper-swollen lamellar phase.

Formation of Hyper-Swollen Lamellar Phase Composed of $C_{12}E_6$-Toluene-Glycerin-Water Four Component System $C_{12}E_6$, toluene, glycerin and deionized water were mixed together in a 20 mL screw cap bottle to prepare solutions having various glycerin concentrations. Each of the solutions was observed for color change while being stirred and heated. The preparations were made so that the $C_{12}E_6$ and toluene concentrations were 2 mass % and 0.67 mass %, respectively, in the whole system. FIG. 14 and FIG. 15 show the results.

Results

As shown in FIG. 14 and FIG. 15, the forming temperature of the hyper-swollen lamellar phase declines as the amount of glycerin added rises. It is thought that the concentration of the system (solution) increases as the amount of glycerin added increases and thus Helfrich interaction changes, lowering the forming temperature of the hyper-swollen lamellar phase. This reveals that addition of glycerin makes it possible to control the forming temperature of the hyper-swollen lamellar phase.

Experiment 5

In Experiment 5, the interlayer distances (which each are the distance between adjacent two bilayer membranes, that is, D in FIG. 1A and FIG. 1B) in the hyper-swollen lamellar phase were compared when the content of polyethylene glycol monoalkyl ether ($C_{12}E_5$ or $C_{12}E_6$) varied.

The experiment was conducted by the following method. The method for forming the hyper-swollen lamellar phase using $C_{12}E_5$ or $C_{12}E_6$ was the same as that in Experiment 4. The interlayer distances were calculated from the wavelength at which the reflected light intensity hit the peak. Specifically, it was carried out as follows. That is, the light was incident into, off the center of, a vial containing a sample. The intensity of the reflected light was measured through a spectroscope at an angle of just $2\theta=24$ degrees. The angle herein refers to the angle between the straight lines passing through the light source and the spectroscope, respectively, with the reflecting point being the origin. In accordance with a Bragg's formula, the interlayer distance $d=\lambda/(2n\cdot\cos\theta)$, where $\lambda$ denotes the wavelength at which the intensity of the reflected light hits the peak. Here, n denotes the refractive index (1.33) of water. Details of the method for measuring the interlayer distance is also described in Nanosheet Formation in Hyperswollen Lyotropic Lamellar Phases, JACS, 138 (4), pp. 1103-1105, 2016, Uchida et al.

Figure 16:
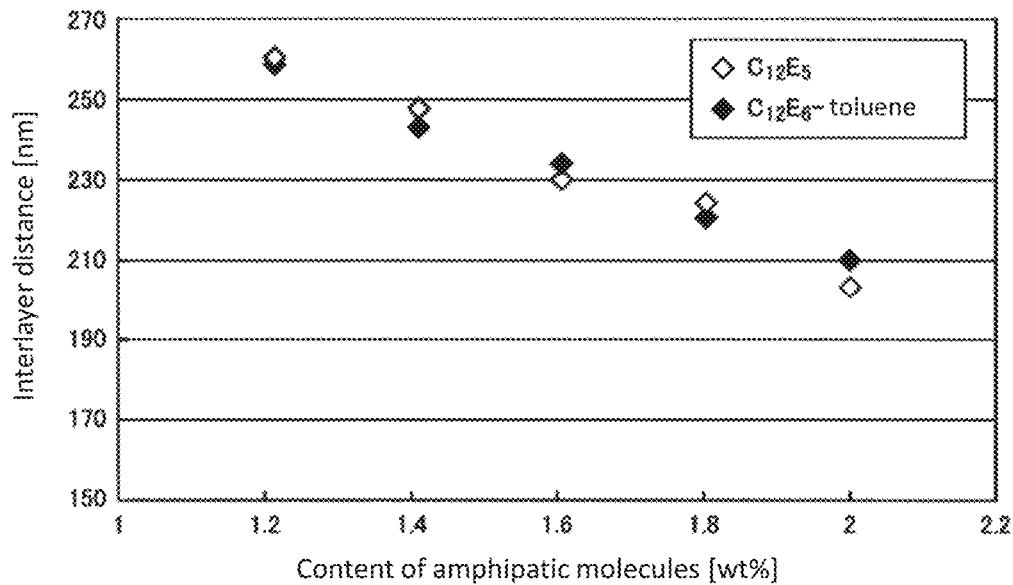
FIG. 16 is a graph showing the effect of the content of amphipathic molecules has on an interlayer distance.

As shown in FIG. 16, there was a tendency that the interlayer distance decreased as the content of the amphipathic molecules increased and the interlayer distance increased as the content decreased. That is, it is possible to control the interlayer distance in the hyper-swollen lamellar phase by changing the content of the amphipathic molecules.

Experiment 6

In Experiment 6, the interlayer distances (which each are the distance between adjacent two of the bilayer membranes, that is, D in FIG. 1A and FIG. 1B) in the hyper-swollen lamellar phase were compared when the content of glycerin varied.

Figure 17:
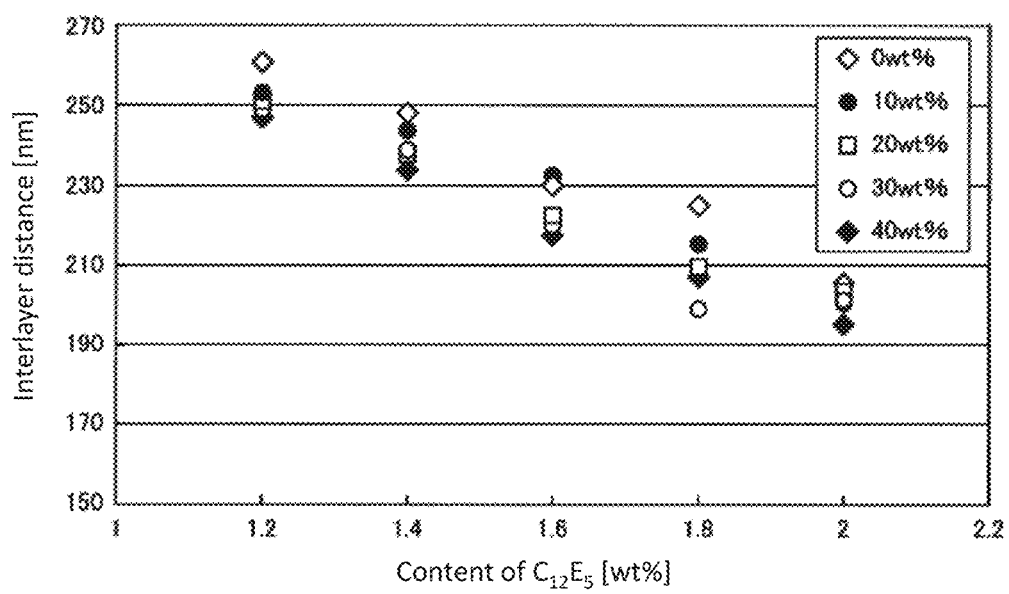
FIG. 17 is a graph showing the effect of the addition of glycerin has on the interlayer distance.

The method for the experiment (including the method for calculating the interlayer distance) is the same as that in Experiment 4 and Experiment 5. FIG. 17 shows the results.

With regard to the content of glycerin, ◇ indicates 0 mass %, ● indicates 10 mass %, □ indicates 20 mass %, ○ indicates 30 mass % and ♦ indicates 40 mass %. As shown in FIG. 17, there was a tendency that the interlayer distance decreased as the content of glycerin increased. That is, it is possible to control the interlayer distance in the hyper-swollen lamellar phase by changing the content of glycerin.

Addition of glycerin increases the viscosity of the solvent. As an effect of the viscosity increase, it is expected that the lamellar phase is stably maintained even at a high temperature. In reality, however, addition of glycerin lowered the forming temperature of the hyper-swollen lamellar phase. This implies that glycerin has a certain impact on the characteristics of the bilayer membrane.

Example 3

Figure 18:
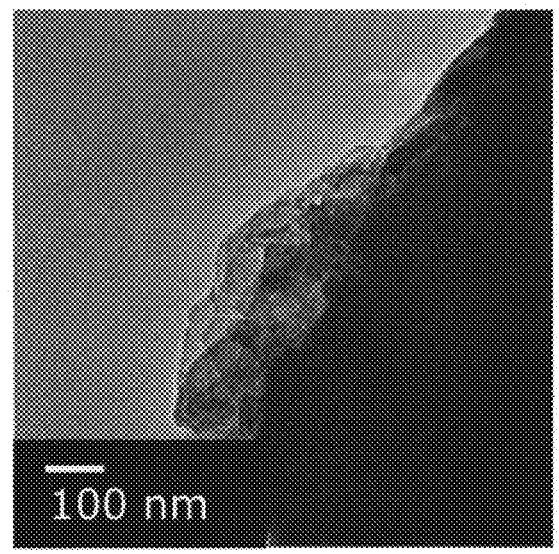
FIG. 18 shows a result of an observation on a silica nanosheet according to Example 3 with a transmission electron microscope.

A surfactant solution was prepared by adding and mixing 9.2 g of n-decane (89.8 mass %), 0.85 g of 1-pentanol (8.3 mass %), 0.09 g of octylbenzenesulfonate (0.9 mass %) and 0.1 g of water (1.0 mass %) in a 20 mL screw cap bottle. As a silica raw material, 0.074 g of tetraethoxysilane (TEOS, available from Wako Pure Chemical Corporation) was added to 10.2 g of the surfactant solution to obtain a mixed solution. The mixed solution was stirred at 300 rpm under ordinary temperature for 72 hours with a magnetic stirrer that was 20 mm in length and 7 mm in diameter. It was confirmed that a hyper-swollen lamellar phase was maintained stably therein. At least one silica nanosheet was produced. The at least one silica nanosheet obtained was in a dispersed state in the solution, and the dispersion went through a washing process to separate at least one silica nanosheet. The washing process was carried out by centrifuging the dispersion first, and then adding methanol to a solid content obtained and centrifuging the mixture, removing a supernatant, adding methanol again and centrifuging the resultant mixture, and removing a supernatant. The washing was carried out sufficiently by repeating the washing process several times, and then a remaining solid was dried at 90° C. for one night. A silica nanosheet obtained was observed with a transmission electron microscope (TEM). FIG. 18 shows the result. The TEM observation was conducted at a magnification of 120,000 and an accelerating voltage of 200 kV. As shown in FIG. 18, it was confirmed that a silica nanosheet was produced.

Example 4

Figure 19:
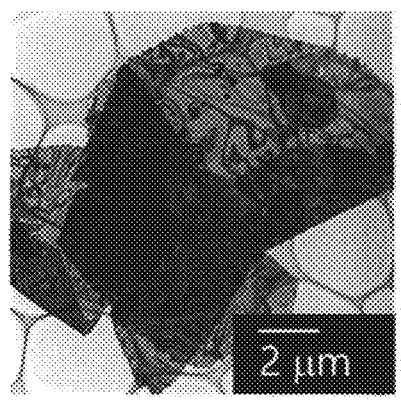
FIG. 19 shows a result of an observation on a gold nanosheet according to Example 4 with a transmission electron microscope.
Figure 20:
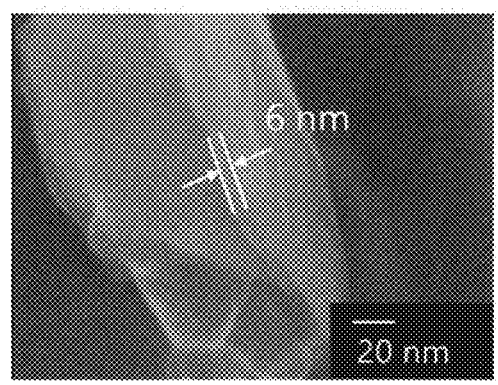
FIG. 20 shows a result of an observation on the gold nanosheet according to Example 4 with a scanning electron microscope.

The surfactant solution described in Example 3 was prepared in the same manner as in Example 3, and 10 mg of hydrogen tetrachloroaurate(III) tetrahydrate $HAuCl_4 \cdot 4H_2O$ available from Wako Pure Chemical Corporation) was added, as a raw material gold-containing compound, to 10.2 g of the surfactant solution. Further, 1 mg of iron(III) chloride (available from Wako Pure Chemical Corporation) was added thereto to obtain a mixed solution. While a hyper-swollen lamellar phase was being maintained stably therein, the mixed solution was irradiated with UV (with a wavelength of 350 nm) emitted from an UV irradiation apparatus (product name: 300 W xenon light source, model number: MAX-303, available from Asahi Spectra Co., Ltd.) for 1 hour. Thus, at least one gold nanosheet was synthesized. The gold nanosheet obtained was in a dispersed state in the solution, and the dispersion went through a washing process to separate the gold nanosheet. The washing process was carried out in the same manner as in Example 3. The washing was carried out sufficiently by repeating the washing process several times, and then a remaining solid was dried at 90° C. for one night. A gold nanosheet obtained was observed with a Transmission Electron Microscope (TEM). FIG. 19 shows the result. The TEM observation was conducted at a magnification of 10,000 and an accelerating voltage of 200 kV. Also, the gold nanosheet obtained was observed with a Scanning Electron Microscope (SEM). FIG. 20 shows the result. The SEM observation was conducted at a magnification of 500,000 and an accelerating voltage of 15 kV. As shown in FIG. 19 and FIG. 20, it was confirmed that a gold nanosheet was produced. The TEM image shows that the gold nanosheet had a width of approximately 4 μm. In addition, the SEM image shows that the gold nanosheet had a thickness of approximately 6 nm.

From the description above, it is clear to persons skilled in the art that there are many possible improvements and other possible embodiments for the present disclosure. Therefore, the description above should be interpreted merely as examples and it is provided in order to teach persons skilled in the art the best mode for carrying out the present disclosure. Without departing from the technical idea of the present disclosure, it is possible to change substantially the structure and/or details of the functions of the present disclosure.

INDUSTRIAL APPLICABILITY

The method for producing a metal organic framework nanosheet according to the present disclosure is useful to produce a nano-size metal organic framework sheet. Also, the method for producing a nanosheet according to the present disclosure has a wide range of options for materials and is useful to produce nanosheets using various raw material compounds. Furthermore, the metal organic framework nanosheet according to the present disclosure is useful as a gas separation membrane.

DESCRIPTION OF NOTATIONS

1 Metal organic framework nanosheet
11 Composite nanosheet
12 Gold nanosheet
3 Solvent
5 Amphipathic molecules
5A Portion having an affinity for the solvent
5B Portion having no affinity for the solvent
10 Bilayer membrane
20 Screw cap bottle
22 Light source
24 Spectroscope

The invention claimed is:

1. A metal organic framework nanosheet comprising a metal organic framework disposed, in a sheet form, between two monolayers constituting a single bilayer membrane, wherein
a plurality of the bilayer membranes forms a hyper-swollen lamellar phase in a solvent.

2. The metal organic framework nanosheet according to claim 1, wherein the bilayer membranes are composed of a nonionic amphiphile.

3. The metal organic framework nanosheet according to claim 2, wherein the nonionic amphiphile is at least one selected from the group consisting of an ester type surfactant, an ether type surfactant, an alkanolamide type surfactant, alkyl glycoside and a higher alcohol.

4. The metal organic framework nanosheet according to claim 3, wherein the nonionic amphiphile is the ether type surfactant, and the ether type surfactant is at least one selected from the group consisting of polyethylene glycol monoalkyl ether and polyoxyethylene alkyl phenyl ether.

5. The metal organic framework nanosheet according to claim 1, wherein the bilayer membranes are composed of polyethylene glycol monoalkyl ether represented by Formula (1) below:

[Chemical Formula 1]

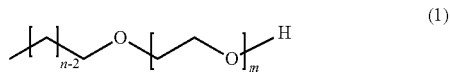

where n denotes the number of carbon atoms in an alkyl group in a hydrophobic portion, and m denotes the number of ethylene oxides in a hydrophilic portion.

6. The metal organic framework nanosheet according to claim 5, wherein $2<n/m<6$.

7. The metal organic framework nanosheet according to claim 5, wherein n is 12 and m is 5.

8. The metal organic framework nanosheet according to claim 1, wherein the solvent includes water.

9. The metal organic framework nanosheet according to claim 5, wherein n is 12 and m is 6, and furthermore, the solvent includes water and an organic solvent.

10. The metal organic framework nanosheet according to claim 6, wherein the metal organic framework is a metal organic framework containing a highly lipophilic ligand as a component.

11. The metal organic framework nanosheet according to claim 1, wherein the hyper-swollen lamellar phase has a lamellar structure in which a distance between any adjacent two of the bilayer membranes is 50 nm or more.

12. A metal organic framework nanosheet dispersion comprising at least one metal organic framework nanosheet in a dispersed state in a liquid, wherein
the metal organic framework nanosheet is the metal organic framework nanosheet according to claim 1.

13. A gas separation membrane comprising the metal organic framework nanosheet according to claim 1.

14. The gas separation membrane according to claim 13, the gas separation membrane being for nitrogen separation or carbon dioxide separation.

15. The metal organic framework nanosheet according to claim 2, wherein the nonionic amphiphile is an ester ether type surfactant.

16. The metal organic framework nanosheet according to claim 1, wherein the solvent includes a solution of water mixed with a water-soluble organic solvent.

17. A method for producing a nanosheet, comprising forming a nanosheet between two monolayers constituting a single bilayer membrane
in a case where a plurality of the bilayer membranes forms a hyper-swollen lamellar phase in a solvent, wherein the nanosheet is composed of a metal organic framework.

18. The method for producing the nanosheet according to claim 17, wherein
the bilayer membranes are formed in the solvent,
an organic ligand is added in the solvent to form the hyper-swollen lamellar phase formed of the bilayer membranes, and
a metal ion is then added in the solvent to form the metal organic framework nanosheet between the two monolayers constituting the single bilayer membrane.

19. The method for producing the nanosheet according to claim 17, wherein the bilayer membranes are removed after the metal organic framework nanosheet is formed between the two monolayers constituting the single bilayer membrane.

20. The method for producing the nanosheet according to claim 17, wherein the bilayer membranes are composed of polyethylene glycol monoalkyl ether represented by Formula (1) below:

[Chemical Formula 2]

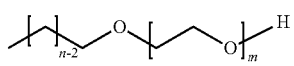
(1)

where n denotes the number of carbon atoms in an alkyl group in a hydrophobic portion, and m denotes the number of ethylene oxides in a hydrophilic portion.

21. The method for producing the nanosheet according to claim 20, wherein 2<n/m<6.

22. The method for producing the nanosheet according to claim 20, wherein n is 12 and m is 5.

23. The method for producing the nanosheet according to claim 18, wherein the solvent includes water.

24. The method for producing the nanosheet according to claim 20, wherein n is 12 and m is 6, and furthermore, the solvent includes water and an organic solvent.

25. The method for producing the nanosheet according to claim 17, wherein the metal organic framework is a metal organic framework containing a highly lipophilic ligand as a component.

26. The method for producing the nanosheet according to claim 18, wherein the solvent includes a solution of water mixed with a water-soluble organic solvent.

27. A method for producing a nanosheet comprising forming a nanosheet between two monolayers constituting a single bilayer membrane in a case where a plurality of the bilayer membranes forms a hyper-swollen lamellar phase in a solvent, wherein the nanosheet is composed of a metal oxide,
wherein the bilayer membranes are formed in the solvent,
an amphiphile is added in the solvent to form the hyper-swollen lamellar phase formed of the bilayer membranes, and a metal-containing compound having an oxygen atom is then added in the solvent to form the metal oxide nanosheet between the two monolayers constituting the single bilayer membrane,
wherein the solvent includes a mixed solution of water and an organic solvent, and
wherein a surface-active auxiliary is further added in the solvent.

28. A method for producing a nanosheet comprising forming a nanosheet between two monolayers constituting a single bilayer membrane in a case where a plurality of the bilayer membranes forms a hyper-swollen lamellar phase in a solvent, wherein the nanosheet is composed of a metal oxide,
wherein the bilayer membranes are formed in the solvent,
an amphiphile is added in the solvent to form the hyper-swollen lamellar phase formed of the bilayer membranes, and a metal-containing compound having an oxygen atom is then added in the solvent to form the metal oxide nanosheet between the two monolayers constituting the single bilayer membrane,
wherein the solvent includes a mixed solution of water and an organic solvent, and
wherein the amphiphile is an anionic amphiphile.

29. A method for producing a nanosheet comprising forming a nanosheet between two monolayers constituting a single bilayer membrane in a case where a plurality of the bilayer membranes forms a hyper-swollen lamellar phase in a solvent, wherein the nanosheet is composed of a metal,
wherein the bilayer membranes are formed in the solvent,
an amphiphile is added in the solvent to form the hyper-swollen lamellar phase formed of the bilayer membranes, and a metal-containing compound having an oxygen atom is then added in the solvent to form the metal nanosheet between the two monolayers constituting the single bilayer membrane,
wherein the solvent includes a mixed solution of water and an organic solvent and
wherein a surface-active auxiliary is further added in the solvent.

30. A method for producing a nanosheet comprising forming a nanosheet between two monolayers constituting a single bilayer membrane in a case where a plurality of the bilayer membranes forms a hyper-swollen lamellar phase in a solvent, wherein the nanosheet is composed of a metal,
wherein the bilayer membranes are formed in the solvent,
an amphiphile is added in the solvent to form the hyper-swollen lamellar phase formed of the bilayer membranes, and a metal-containing compound having an oxygen atom is then added in the solvent to form the metal nanosheet between the two monolayers constituting the single bilayer membrane,
wherein the solvent includes a mixed solution of water and an organic solvent and
wherein the amphiphile is an anionic amphiphile.

* * * * *